(12) United States Patent
Takemoto et al.

(10) Patent No.: US 11,817,902 B2
(45) Date of Patent: Nov. 14, 2023

(54) ORIENTATION DIRECTION CONTROL DEVICE, OPTICAL COMMUNICATION TERMINAL, OPTICAL COMMUNICATION SYSTEM, AND ORIENTATION DIRECTION CONTROL METHOD

(71) Applicant: Mitsubishi Electric Corporation, Tokyo (JP)

(72) Inventors: Yuta Takemoto, Tokyo (JP); Toshiyuki Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/836,350

(22) Filed: Jun. 9, 2022

(65) Prior Publication Data
US 2022/0303008 A1 Sep. 22, 2022

Related U.S. Application Data

(63) Continuation of application No. PCT/JP2020/004460, filed on Feb. 6, 2020.

(51) Int. Cl.
*H04B 10/00* (2013.01)
*H04B 10/118* (2013.01)

(52) U.S. Cl.
CPC .................. *H04B 10/118* (2013.01)

(58) Field of Classification Search
CPC ... H04B 10/11; H04B 10/118; H04B 10/1123; H04B 10/1125; H04B 10/1127;
(Continued)

(56) References Cited

U.S. PATENT DOCUMENTS 9,042,734 B2 * 5/2015 Makowski ......... H04B 10/1123
398/118
2001/0009466 A1 7/2001 Shiratama
(Continued)

FOREIGN PATENT DOCUMENTS

CN 109450521 A 3/2019
WO WO 2018/128118 A 7/2018

OTHER PUBLICATIONS

Ando et al., "Dual wavelength optical coherent receiver front end for inter-satellite communication", Proc. International Conference on Space Optical Systems and Applications (ICSOS), p. 6. May 7-9, 2014, 4 pages.

(Continued)

*Primary Examiner* — Hanh Phan
(74) *Attorney, Agent, or Firm* — BIRCH, STEWART, KOLASCH & BIRCH, LLP

(57) ABSTRACT

An orientation direction control device includes: an orientation direction control information acquisition unit to acquire orientation direction control information for controlling an orientation direction in which a first optical communication terminal as a first transmission/reception device transmits and receives light; and a capture and tracking control unit as an orientation direction control unit to control an orientation direction in which a second optical communication terminal as a second transmission/reception device transmits and receives the light or a radio wave on the basis of the orientation direction control information acquired by the orientation direction control information acquisition unit.

10 Claims, 10 Drawing Sheets

(58) Field of Classification Search
CPC ............ H04B 10/1129; H04B 10/1143; H04B 10/1149; H04B 10/40; H04B 10/29; H04B 7/18513; H04B 7/18515; H04B 10/25753
USPC ....... 398/118, 119, 120, 121, 122, 123, 124, 398/125, 126, 128, 129, 130, 131, 135, 398/136, 202, 208, 209, 158, 159, 33, 38, 398/25, 26, 27; 455/427, 12.1, 13.1, 428
See application file for complete search history.

(56) References Cited

U.S. PATENT DOCUMENTS

| | | | | |
|---|---|---|---|---|
| 2014/0376914 A1* | 12/2014 | Miniscalco | ........ | H04B 10/1129 398/58 |
| 2019/0028197 A1* | 1/2019 | Turner | ................. | H04B 10/118 |
| 2020/0127738 A1 | 4/2020 | Nakao et al. | | |

OTHER PUBLICATIONS

International Search Report (PCT/ISA/210) issued in PCT/JP2020/004460, dated Apr. 21, 2020.
Written Opinion of the International Searching Authority (PCT/ISA/237) issued in PCT/JP2020/004460, dated Apr. 21, 2020.
Yamakawa et al., "Optical Inter-Orbit Communication Technology: Future Space Communication Infrastructure", The Review of Laser Engineering, The Laser Society of Japan, vol. 39, No. 1, Jan. 2011, pp. 17-23.
Extended European Search Report for European Application No. 20917928.2, dated Dec. 21, 2022.

\* cited by examiner

ORIENTATION DIRECTION CONTROL DEVICE, OPTICAL COMMUNICATION TERMINAL, OPTICAL COMMUNICATION SYSTEM, AND ORIENTATION DIRECTION CONTROL METHOD

CROSS-REFERENCE TO RELATED APPLICATION

This application is a continuation application of International Application No. PCT/JP2020/004460 having an international filing date of Feb. 6, 2020, which is hereby expressly incorporated by reference into the present application.

TECHNICAL FIELD

The present disclosure relates to an orientation direction control device to control an orientation direction in which light or a radio wave is transmitted and received.

BACKGROUND ART

In technologies to transmit and receive light or a radio wave in a satellite, due to the high directional characteristics of light or a radio wave transmitted and received by a transmission/reception device installed on the satellite, a disturbance of the satellite itself is problematic. For example, when a microradian-class disturbance that cannot be suppressed by the satellite is caused in the satellite, the orientation direction in which the transmission/reception device transmits and receives the light or the radio wave deviates. In addition, the orientation direction may deviate due to other causes. If the orientation direction of the transmission/reception device deviates, communication quality may degrade. For that reason, the transmission/reception device installed on the satellite has performance of maintaining accuracy of the orientation direction by correcting deviation in the orientation direction on the basis of light such as beacon light received from a transmission/reception device installed on another satellite other than the satellite (see, for example, Non-Patent Literature 1).

CITATION LIST

Non-Patent Literature

Non-Patent Literature 1: Optical Inter-Orbit Communication Technology: Future Space Communication Infrastructure (The Review of Laser Engineering, January 2011, Shiro Yamakawa, Takashi Jono, Japan Aerospace Exploration Agency)

SUMMARY OF INVENTION

Technical Problem

For example, in a case where a satellite relays a signal, multiple transmission/reception devices are installed on the satellite to communicate with multiple other satellites or to observe the Earth while communicating with the other satellites. In such a satellite, to improve the communication quality, it is necessary to improve the performance of maintaining the accuracy of the orientation direction for any of the transmission/reception devices. For that reason, there is a problem that it is necessary to provide equipment such as a high-performance sensor for any of the transmission/reception devices.

The present disclosure has been made to solve the problem described above, and it is an object to provide a technology for maintaining the accuracy of the orientation direction without providing equipment such as a high-performance sensor for at least one or more transmission/reception devices among multiple transmission/reception devices installed on a satellite.

Solution to Problem

An orientation direction control device according to the present disclosure controls an orientation direction in which, in a satellite on which a first transmission/reception device to transmit and receive light and a second transmission/reception device to transmit and receive light or a radio wave are installed, the second transmission/reception device transmits and receives the light or the radio wave, and the orientation direction control device includes: processing circuitry to acquire orientation direction control information for controlling an orientation direction in which the first transmission/reception device transmits and receives the light, and to control the orientation direction in which the second transmission/reception device transmits and receives the light or the radio wave, on a basis of the acquired orientation direction control information, wherein the first transmission/reception device is a first optical communication terminal to perform optical communication via a first optical link, the second transmission/reception device is a second optical communication terminal to perform optical communication via a second optical link, the acquired orientation direction control information includes a first error of an orientation angle at which the first optical communication terminal performs optical communication via the first optical link, and the processing circuitry controls capture and tracking for maintaining the second optical link, by controlling an orientation direction in which the second optical communication terminal performs optical communication via the second optical link, on a basis of the acquired first error.

Advantageous Effects of Invention

According to the present disclosure, it is possible to maintain the accuracy of the orientation direction without providing equipment such as a high-performance sensor, for at least one or more transmission/reception devices among multiple transmission/reception devices installed on a satellite.

DESCRIPTION OF EMBODIMENTS

Hereinafter, to explain the present disclosure in more detail, embodiments for carrying out the present disclosure will be described with reference to the accompanying drawings.

First Embodiment

Figure 1:
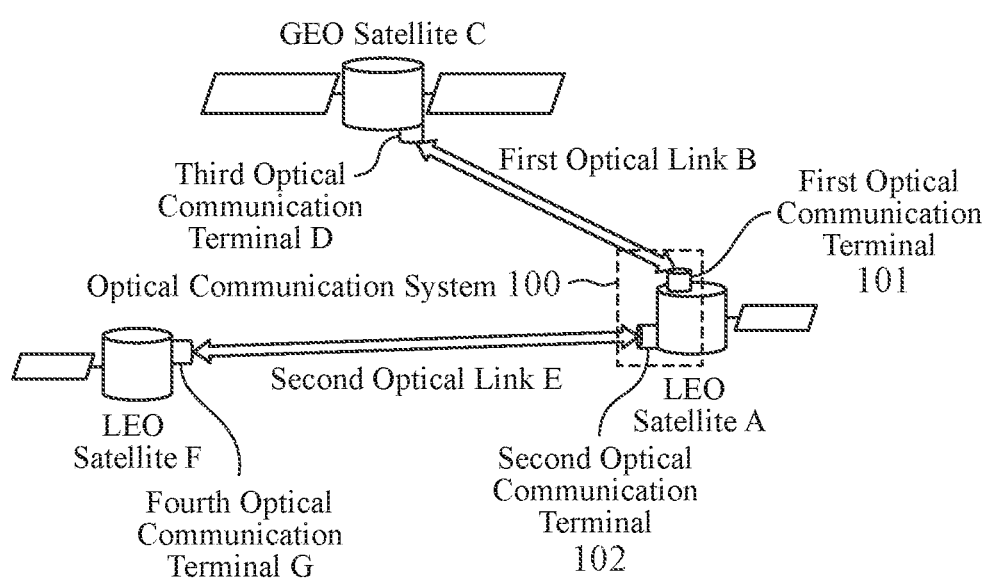
FIG. 1 is a schematic diagram illustrating a state in which an optical communication system according to a first embodiment performs optical communication.

FIG. 1 is a schematic diagram illustrating a state in which an optical communication system 100 according to a first embodiment performs optical communication. The optical communication system 100 includes a first transmission/reception device to transmit and receive light and a second transmission/reception device to transmit and receive the light or a radio wave. In the first embodiment, as illustrated in FIG. 1, the optical communication system 100 includes a first optical communication terminal 101 and a second optical communication terminal 102. Note that, in the first embodiment, a configuration will be described in which the optical communication system 100 includes two transmission/reception devices, the first optical communication terminal 101 as the first transmission/reception device and the second optical communication terminal 102 as the second transmission/reception device; however, the number of transmission/reception devices included in the optical communication system 100 is not particularly limited.

The first optical communication terminal 101 and the second optical communication terminal 102 each are installed on a LEO satellite A. The first optical communication terminal 101 performs optical communication with a third optical communication terminal D installed on a GEO satellite C via a first optical link B. In addition, the second optical communication terminal 102 performs optical communication with a fourth optical communication terminal G installed on a LEO satellite F via a second optical link E.

As used herein, "satellite" means an artificial satellite. In addition, "optical communication" means that communication is performed by transmitting and receiving an optical signal to which data is added. In addition, "Low Earth Orbit (LEO) of the LEO satellite" means a low earth orbit, and "Geostationary Earth Orbit (GEO) of the GEO satellite" means a geostationary orbit. In the first embodiment, the GEO satellite C is assumed to be a satellite that is stable and has a low disturbance as compared with the LEO satellite A and the LEO satellite F, and the LEO satellite A and the LEO satellite F are assumed to be satellites that have large disturbances as compared with the GEO satellite C.

Note that, in the first embodiment, a role of the GEO satellite C is to provide a line that is not easily affected by the disturbance. For that reason, instead of the GEO satellite C, the third optical communication terminal D may be provided in a low-disturbance LEO, medium earth orbit (MEO), or a ground station. In that case, the first optical communication terminal 101 performs optical communication with the third optical communication terminal D installed on the LEO, MEO, or the ground station via the first optical link B. Alternatively, a configuration of the first optical communication terminal 101 may be a configuration by which light is transmitted to a prism or a mirror installed on a stable place (for example, a planet) with less disturbance than the LEO satellite A and reflected light is received, instead of a configuration by which optical communication with the third optical communication terminal D is performed. In that case, the term "optical communication" also used in the following description is replaced with optical transmission and reception.

Figure 2:
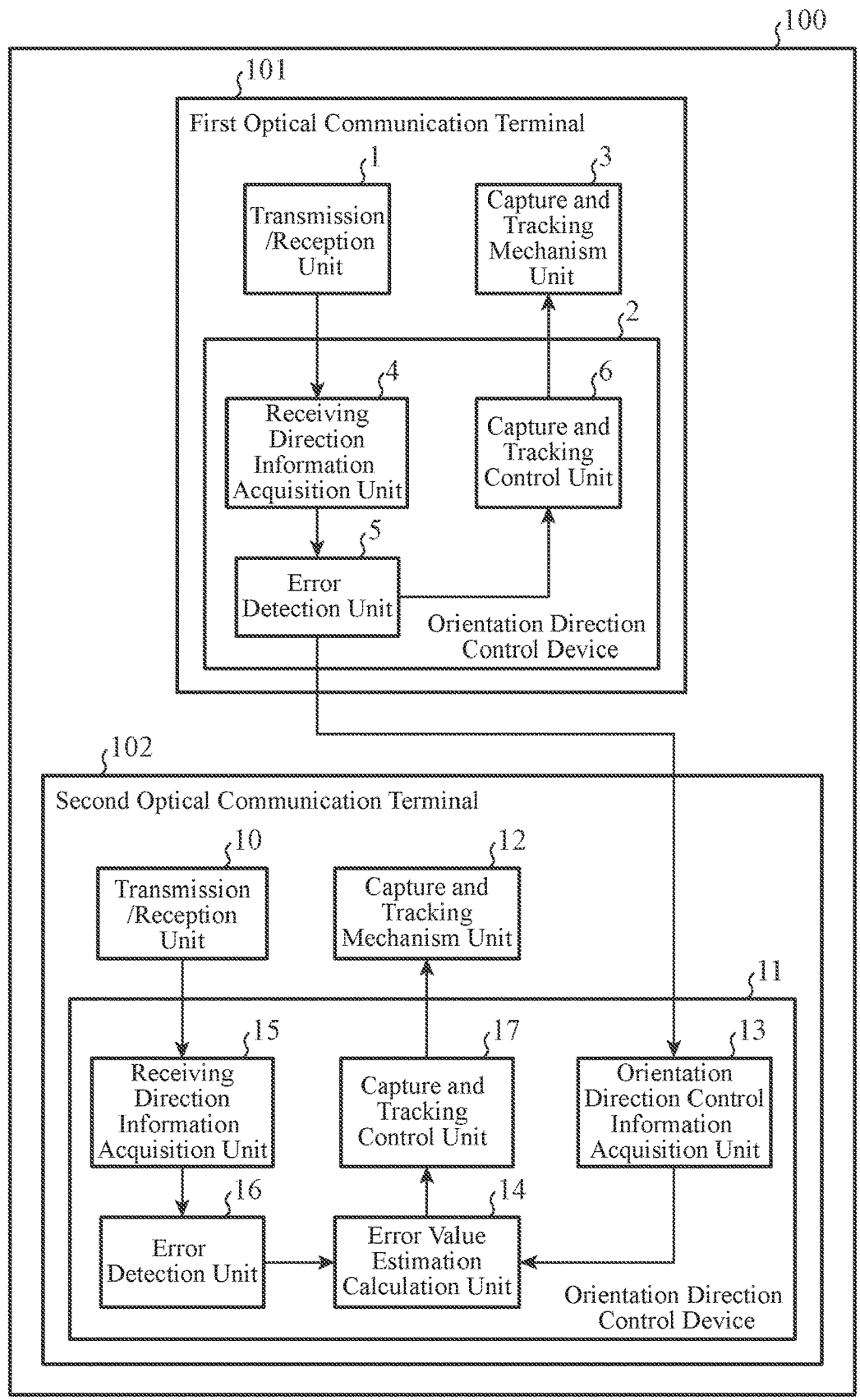
FIG. 2 is a block diagram illustrating a configuration of the optical communication system according to the first embodiment.

FIG. 2 is a block diagram illustrating a configuration of the optical communication system 100 according to the first embodiment. As illustrated in FIG. 2, the optical communication system 100 includes the first optical communication terminal 101 and the second optical communication terminal 102.

The first optical communication terminal 101 includes a transmission/reception unit 1, an orientation direction control device 2, and a capture and tracking mechanism unit 3. The orientation direction control device 2 includes a receiving direction information acquisition unit 4, an error detection unit 5, and a capture and tracking control unit 6.

By receiving light via the first optical link B, the transmission/reception unit 1 detects receiving direction information regarding a direction in which the light is received via the first optical link B. The transmission/reception unit 1 outputs the detected receiving direction information to the orientation direction control device 2. More specifically, the receiving direction information detected by the transmission/reception unit 1 is, for example, an incident direction of the light transmitted by the third optical communication terminal D of the GEO satellite C on the transmission/reception unit 1. Note that, the receiving direction information may include information regarding a position where the transmission/reception unit 1 receives the light via the first optical link B. In that case, the receiving direction information is, for example, an incident position of the light transmitted by the third optical communication terminal D of the GEO satellite C on the transmission/reception unit 1.

The receiving direction information acquisition unit 4 acquires the receiving direction information detected by the transmission/reception unit 1. The receiving direction information acquisition unit 4 outputs the acquired receiving direction information to the error detection unit 5.

The error detection unit 5 detects a first error of an orientation angle at which the first optical communication terminal 101 performs optical communication via the first optical link B, by referring to the receiving direction information acquired by the receiving direction information acquisition unit 4. More specifically, the error detection unit 5 detects the first error of the orientation angle at which the transmission/reception unit 1 of the first optical communication terminal 101 performs optical communication via the first optical link B, by referring to the receiving direction information acquired by the receiving direction information acquisition unit 4. The error detection unit 5 outputs the detected first error to the capture and tracking control unit 6, and an orientation direction control device 11 of the second optical communication terminal 102 described later.

Note that, the error detected by the error detection unit 5 is, for example, a difference between the orientation angle at which the transmission/reception unit 1 performs optical communication via the first optical link B and a target orientation angle used for control by the capture and tracking control unit 6 described later. In addition, in a case where the receiving direction information includes information regarding the position where the transmission/reception unit 1 receives the light via the first optical link B, the error detection unit 5 may further detect an error of the position where the transmission/reception unit 1 performs optical communication via the first optical link B, by referring to the receiving direction information acquired by the receiving direction information acquisition unit 4. In that case, the error of the position detected by the error detection unit 5 is, for example, a difference between the position where the transmission/reception unit 1 performs optical communication via the first optical link B and a target position used for control by the capture and tracking control unit 6 described later.

The capture and tracking control unit 6 controls capture and tracking for maintaining the first optical link B, by controlling an orientation direction in which the first optical communication terminal 101 performs optical communication via the first optical link B, on the basis of the first error detected by the error detection unit 5. More specifically, in the first embodiment, the capture and tracking control unit 6 controls the capture and tracking for maintaining the first optical link B, by controlling the orientation direction in which the transmission/reception unit 1 of the first optical communication terminal 101 performs optical communication via the first optical link B, on the basis of the first error detected by the error detection unit 5. For example, when controlling the orientation angle of the transmission/reception unit 1 to the target orientation angle, the capture and tracking control unit 6 adjusts an amount of control by an amount of the first error. Note that, in a case where the error detection unit 5 detects the error of the position as described above, the capture and tracking control unit 6 may control the capture and tracking for maintaining the first optical link B, by controlling the position where the transmission/reception unit 1 performs optical communication via the first optical link B, on the basis of the error of the position detected by the error detection unit 5.

The capture and tracking mechanism unit 3 performs the capture and tracking for maintaining the first optical link B by changing the orientation direction of the transmission/reception unit 1 on the basis of control by the capture and tracking control unit 6. Note that, in a case where the capture and tracking control unit 6 controls the position of the transmission/reception unit 1 on the basis of the error of the position as described above, the capture and tracking mechanism unit 3 may perform the capture and tracking for maintaining the first optical link B, by further changing the position of the transmission/reception unit 1, on the basis of the control by the capture and tracking control unit 6. An example of the capture and tracking mechanism unit 3 is a piezo actuator or the like.

The second optical communication terminal 102 includes a transmission/reception unit 10, the orientation direction control device 11, and a capture and tracking mechanism unit 12. The orientation direction control device 11 includes an orientation direction control information acquisition unit 13, an error value estimation calculation unit 14, a receiving direction information acquisition unit 15, an error detection unit 16, and a capture and tracking control unit 17.

Note that, regarding capture and tracking for maintaining the second optical link E by the second optical communication terminal 102, only coarse capture is assumed to have been established. As used herein, "coarse capture" means a state in which the second optical communication terminal 102 can perform tracking with the fourth optical communication terminal G by using beacon light or the like, or a state in which the second optical communication terminal 102 can perform capture by a tracking sensor of the transmission/reception unit 10 but cannot always perform capture by a communication sensor of the transmission/reception unit 10. As the reason why the second optical communication terminal 102 cannot perform precision capture, it is conceivable that, for example, the capture and tracking mechanism unit 12 that has received feedback has oscillated due to insufficient resolution of the tracking sensor of the transmission/reception unit 10 or control delay, due to satellite disturbance of the LEO satellite A.

By receiving light via the second optical link E, the transmission/reception unit 10 detects receiving direction information regarding a direction in which the light is received via the second optical link E. The transmission/reception unit 10 outputs the received receiving direction information to the receiving direction information acquisition unit 15. More specifically, the receiving direction information is, for example, an incident direction of light transmitted by the fourth optical communication terminal G of the LEO satellite F on the transmission/reception unit 10. Note that, the receiving direction information may include information regarding a position where the transmission/reception unit 10 receives the light via the second optical link E. In that case, the receiving direction information is, for example, an incident position of the light transmitted by the fourth optical communication terminal G of the LEO satellite F on the transmission/reception unit 10.

The orientation direction control information acquisition unit 13 acquires orientation direction control information for controlling the orientation direction in which the first optical communication terminal 101 transmits and receives light. More specifically, in the first embodiment, the orientation direction control information acquisition unit 13 acquires orientation direction control information including the first error of the orientation angle at which the transmission/reception unit 1 of the first optical communication terminal 101 performs optical communication via the first optical link B, from the error detection unit 5 of the orientation direction control device 2 of the first optical communication terminal 101. The orientation direction control information acquisition unit 13 outputs the acquired orientation direction control information to the error value estimation calculation unit 14.

Note that, the orientation direction control information acquired by the orientation direction control information acquisition unit 13 may further include an error of a position where the transmission/reception unit 1 of the first optical communication terminal 101 performs optical communication via the first optical link B. In addition, the orientation direction control information acquisition unit 13 may further acquire at least one or more pieces of orientation direction control information from at least one or more optical communication terminals (not illustrated) installed on the LEO satellite A that are separate from the first optical communication terminal 101 and the second optical communication terminal 102.

The error value estimation calculation unit 14 estimates a second error of an orientation angle at which the second optical communication terminal 102 performs optical communication via the second optical link E, on the basis of the first error acquired by the orientation direction control information acquisition unit 13. More specifically, the error value estimation calculation unit 14 estimates the second error of the orientation angle at which the transmission/reception unit 10 of the second optical communication terminal 102 performs optical communication via the second optical link E, on the basis of the first error acquired by the orientation direction control information acquisition unit 13. At that time, the error value estimation calculation unit 14 may perform conversion to a disturbance value indicating a degree of disturbance of the LEO satellite A on the basis of the first error acquired by the orientation direction control information acquisition unit 13, and, on the basis of the disturbance value obtained by this conversion, estimate the second error of the orientation angle at which the transmission/reception unit 10 of the second optical communication terminal 102 performs optical communication via the second optical link E.

Note that, in a case where the orientation direction control information acquired by the orientation direction control information acquisition unit 13 includes the error of the position as described above, the error value estimation calculation unit 14 may estimate an error of a position where the transmission/reception unit 10 of the second optical communication terminal 102 performs optical communication via the second optical link E, on the basis of the error of the position acquired by the orientation direction control information acquisition unit 13. In addition, in a case where the orientation direction control information acquisition unit 13 acquires at least one or more pieces of orientation direction control information from at least one or more other optical communication terminals, the error value estimation calculation unit 14 may further estimate the second error of the orientation angle at which the second optical communication terminal 102 performs optical communication via the second optical link E, on the basis of errors in orientation angles of the at least one or more other optical communication terminals included in the at least one or more pieces of orientation direction control information acquired by the orientation direction control information acquisition unit 13.

The receiving direction information acquisition unit 15 acquires the receiving direction information regarding a direction in which the second optical communication terminal 102 receives the light via the second optical link E. More specifically, in the first embodiment, the receiving direction information acquisition unit 15 acquires the receiving direction information regarding the direction in which the transmission/reception unit 10 of the second optical communication terminal 102 receives the light via the second optical link E. The receiving direction information acquisition unit 15 outputs the acquired receiving direction information to the error detection unit 16.

The error detection unit 16 detects a third error of the orientation angle at which the second optical communication terminal 102 performs optical communication via the second optical link E, by referring to the receiving direction information acquired by the receiving direction information acquisition unit 15. More specifically, in the first embodiment, the error detection unit 16 detects the third error of the orientation angle at which the transmission/reception unit 10 of the second optical communication terminal 102 performs optical communication via the second optical link E, by referring to the receiving direction information acquired by the receiving direction information acquisition unit 15. The error detection unit 16 outputs the detected third error to the error value estimation calculation unit 14. The error value estimation calculation unit 14 may output the estimated second error and the acquired third error to the capture and tracking control unit 17 as they are, or may calculate an error with higher accuracy than these errors on the basis of the second error and the third error, and output the error to the capture and tracking control unit 17.

Note that, the error detected by the error detection unit 16 is, for example, a difference between the orientation angle at which the transmission/reception unit 10 performs optical communication via the second optical link E and a target orientation angle used for control by the capture and tracking control unit 17 described later. In addition, in a case where the receiving direction information includes information regarding the position where the transmission/reception unit 10 receives the light via the second optical link E, the error detection unit 16 may further detect the error of the position where the transmission/reception unit 10 performs optical communication via the second optical link E, by referring to the receiving direction information acquired by the receiving direction information acquisition unit 15. In that case, the error of the position detected by the error detection unit 16 is, for example, a difference between the position where the transmission/reception unit 10 performs optical communication via the second optical link E and a target position used for control by the capture and tracking control unit 17 described later.

The capture and tracking control unit 17 is an orientation direction control unit to control an orientation direction in which the second optical communication terminal 102 as the second transmission/reception device transmits and receives the light or the radio wave, on the basis of the orientation direction control information acquired by the orientation direction control information acquisition unit 13. More specifically, in the first embodiment, the capture and tracking control unit 17 controls the capture and tracking for maintaining the second optical link E, by controlling an orientation direction in which the transmission/reception unit 10 of the second optical communication terminal 102 performs optical communication via the second optical link E, on the basis of the first error acquired by the orientation direction control information acquisition unit 13. Furthermore, more specifically, the capture and tracking control unit 17 controls the capture and tracking for maintaining the second optical link E, by controlling the orientation direction in which the transmission/reception unit 10 of the second optical communication terminal 102 performs optical communication via the second optical link E, on the basis of the second error estimated on the basis of the first error by the error value estimation calculation unit 14. For example, when controlling the orientation angle of the transmission/reception unit 10 to the target orientation angle, the capture and tracking control unit 17 adjusts an amount of control by an amount of the second error.

Further more specifically, the capture and tracking control unit 17 controls the capture and tracking for maintaining the second optical link E, by controlling the orientation direction in which the transmission/reception unit 10 of the second optical communication terminal 102 performs optical communication via the second optical link E, further on the basis of the third error detected by the error detection unit 16. In that case, the capture and tracking control unit 17 may control the orientation direction in which the transmission/reception unit 10 performs optical communication via the second optical link E, for example, by using the second error as an amount of feedforward and the third error as an amount of feedback. As a result, capture and tracking capability for maintaining the second optical link E by the second optical communication terminal 102 is improved. Even in a case where the second optical communication terminal 102 performs precision capture, precision capture accuracy can be improved, and it is not limited to a case where the second optical communication terminal 102 cannot perform precision capture and performs coarse capture. As an effect due to improvement of the precision capture accuracy, improvement of received light power can be expected.

Note that, in a case where the error detection unit 16 detects the error of the position as described above, the capture and tracking control unit 17 may control the capture and tracking for maintaining the second optical link E, by controlling a position where the transmission/reception unit 10 performs optical communication via the second optical link E, on the basis of the error of the position detected by the error detection unit 16. In addition, in a case where the error value estimation calculation unit 14 further estimates the second error on the basis of errors of the orientation angles of at least one or more other optical communication terminals, the capture and tracking control unit 17 may control the capture and tracking for maintaining the second optical link E, by controlling the orientation direction in which the transmission/reception unit 10 of the second optical communication terminal 102 performs optical communication via the second optical link E, further on the basis of the second error.

The capture and tracking mechanism unit 12 performs the capture and tracking for maintaining the second optical link E by changing the orientation direction of the transmission/reception unit 10 on the basis of control by the capture and tracking control unit 17. Note that, in a case where the capture and tracking control unit 17 controls the position of the transmission/reception unit 10 on the basis of the error of the position as described above, the capture and tracking mechanism unit 12 may perform the capture and tracking for maintaining the second optical link E, by further changing the position of the transmission/reception unit 10, on the basis of the control by the capture and tracking control unit 17. An example of the capture and tracking mechanism unit 12 is a piezo actuator or the like.

Figure 3:
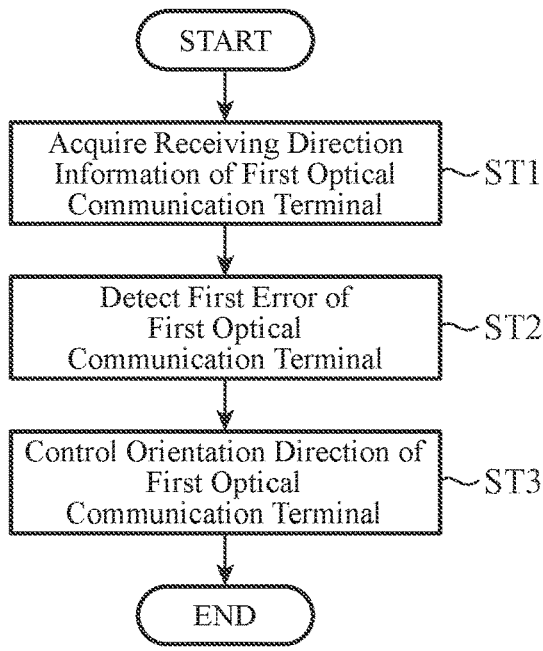
FIG. 3 is a flowchart illustrating an orientation direction control method by an orientation direction control device according to the first embodiment.

Next, operation of the orientation direction control device 2 of the first optical communication terminal 101 according to the first embodiment will be described with reference to the drawings. FIG. 3 is a flowchart illustrating an orientation direction control method by the orientation direction control device 2. Note that, before the following orientation direction control method is implemented, the transmission/reception unit 1 is assumed to detect receiving direction information regarding the direction in which the light is received via the first optical link B, by receiving the light via the first optical link B.

As illustrated in FIG. 3, the receiving direction information acquisition unit 4 acquires the receiving direction information detected by the transmission/reception unit 1 (step ST1). The receiving direction information acquisition unit 4 outputs the acquired receiving direction information to the error detection unit 5.

Next, the error detection unit 5 detects the first error of the orientation angle at which the transmission/reception unit 1 performs optical communication via the first optical link B, by referring to the receiving direction information acquired by the receiving direction information acquisition unit 4 (step ST2). The error detection unit 5 outputs the detected first error to the capture and tracking control unit 6 and the orientation direction control information acquisition unit 13 of the orientation direction control device 11 of the second optical communication terminal 102.

Next, the capture and tracking control unit 6 controls the capture and tracking for maintaining the first optical link B, by controlling the orientation direction in which the transmission/reception unit 1 performs optical communication via the first optical link B, on the basis of the first error detected by the error detection unit 5 (step ST3).

The capture and tracking mechanism unit 3 performs the capture and tracking for maintaining the first optical link B by changing the orientation direction of the transmission/reception unit 1 on the basis of the control by the capture and tracking control unit 6 in step ST3. The transmission/reception unit 1 whose orientation direction has been changed by the capture and tracking mechanism unit 3 detects receiving direction information regarding the direction in which the light is received via the first optical link B, by receiving the light via the first optical link B again. The orientation direction control device 2 executes steps ST1 to ST3 again on the basis of the receiving direction information detected again by the transmission/reception unit 1. The first optical communication terminal 101 performs the capture and tracking for maintaining the first optical link B, by repeating the operation described above.

Figure 4:
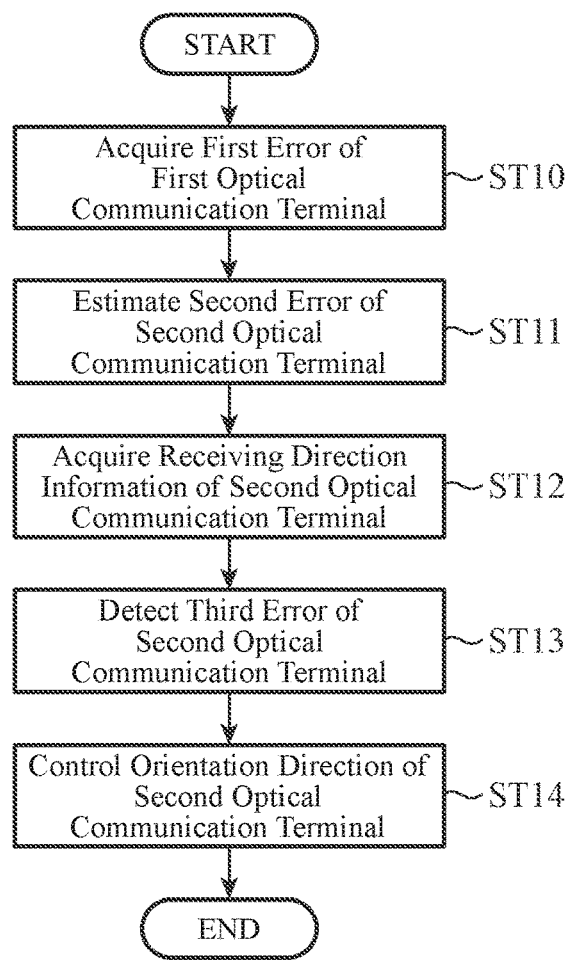
FIG. 4 is a flowchart illustrating an orientation direction control method by the orientation direction control device according to the first embodiment.

Next, operation of the orientation direction control device 11 of the second optical communication terminal 102 according to the first embodiment will be described with reference to the drawing. FIG. 4 is a flowchart illustrating an orientation direction control method by the orientation direction control device 11. Note that, before the following orientation direction control method is implemented, the transmission/reception unit 10 is assumed to detect the receiving direction information regarding the direction in which light is received via the second optical link E, by receiving the light via the second optical link E.

As illustrated in FIG. 4, the orientation direction control information acquisition unit 13 acquires the orientation direction control information including the first error of the orientation angle at which the transmission/reception unit 1 of the first optical communication terminal 101 performs optical communication via the first optical link B, from the error detection unit 5 of the orientation direction control device 2 of the first optical communication terminal 101 (step ST10). The orientation direction control information acquisition unit 13 outputs the acquired orientation direction control information to the error value estimation calculation unit 14.

Next, the error value estimation calculation unit 14 estimates the second error of the orientation angle at which the transmission/reception unit 10 performs optical communication via the second optical link E, on the basis of the first error acquired by the orientation direction control information acquisition unit 13 (step ST11).

Next, the receiving direction information acquisition unit 15 acquires the receiving direction information regarding the direction in which the transmission/reception unit 10 receives the light via the second optical link E (step ST12). The receiving direction information acquisition unit 15 outputs the acquired receiving direction information to the error detection unit 16.

Next, the error detection unit 16 detects the third error of the orientation angle at which the transmission/reception unit 10 performs optical communication via the second optical link E, by referring to the receiving direction information acquired by the receiving direction information acquisition unit 15 (step ST13). The error detection unit 16 outputs the detected third error to the error value estimation calculation unit 14. The error value estimation calculation unit 14 outputs the second error estimated in step ST11 and the acquired third error to the capture and tracking control unit 17.

The capture and tracking control unit 17 controls the capture and tracking for maintaining the second optical link E, by controlling the orientation direction in which the transmission/reception unit 10 performs optical communication via the second optical link E, on the basis of the second error estimated on the basis of the first error by the error value estimation calculation unit 14 in step ST11 and the third error detected by the error detection unit 16 in step ST13 (step ST14).

The capture and tracking mechanism unit 12 performs the capture and tracking for maintaining the second optical link E by changing the orientation direction of the transmission/reception unit 10 on the basis of the control by the capture and tracking control unit 17 in step ST14. The transmission/reception unit 10 whose orientation direction has been changed by the capture and tracking mechanism unit 12 detects the receiving direction information regarding the direction in which the light is received via the second optical link E, by receiving the light via the second optical link E again. Then, the orientation direction control device 11 executes steps ST10 to ST14 described above again. The second optical communication terminal 102 performs the capture and tracking for maintaining the second optical link E by repeating the operation described above.

Functions of the receiving direction information acquisition unit 4, the error detection unit 5, and the capture and tracking control unit 6 in the orientation direction control device 2 are implemented by a processing circuit. That is, the orientation direction control device 2 includes the processing circuit for executing the processing from step ST1 to step ST3 illustrated in FIG. 3. The processing circuit may be dedicated hardware, or a central processing unit (CPU) for executing a program stored in a memory.

In addition, functions of the orientation direction control information acquisition unit 13, the error value estimation calculation unit 14, the receiving direction information acquisition unit 15, the error detection unit 16, and the capture and tracking control unit 17 in the orientation direction control device 11 are implemented by a processing circuit. That is, the orientation direction control device 11 includes the processing circuit for executing the processing from step ST10 to step ST14 illustrated in FIG. 4. The processing circuit may be dedicated hardware, or a central processing unit (CPU) for executing a program stored in a memory.

Figure 5A:
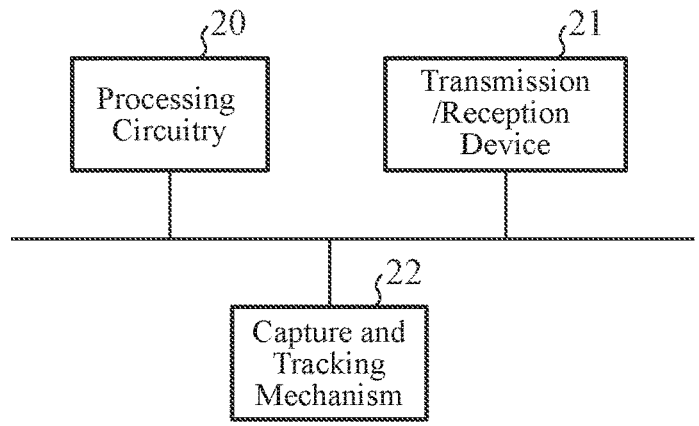
FIG. 5A is a block diagram illustrating a hardware configuration for implementing a function of the orientation direction control device.
Figure 5B:
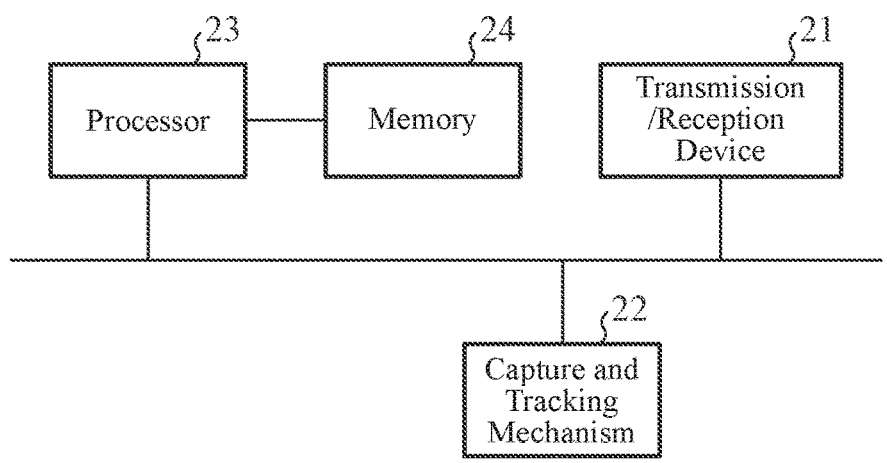
FIG. 5B is a block diagram illustrating a hardware configuration for executing software for implementing the function of the orientation direction control device.

FIG. 5A is a block diagram illustrating a hardware configuration for implementing a function of the orientation direction control device 2 or the orientation direction control device 11. FIG. 5B is a block diagram illustrating a hardware configuration for executing software for implementing the function of the orientation direction control device 2 or the orientation direction control device 11. The transmission/reception device 21 illustrated in each of FIGS. 5A and 5B executes the function of the transmission/reception unit 1 or the function of the transmission/reception unit 10. The capture and tracking mechanism 22 illustrated in each of FIGS. 5A and 5B executes the function of the capture and tracking mechanism unit 3 or the function of the capture and tracking mechanism unit 12.

In a case where the processing circuit is a processing circuitry 20 of the dedicated hardware illustrated in FIG. 5A, examples of the processing circuitry 20 include a single circuit, a composite circuit, a programmed processor, a parallel-programmed processor, an application specific integrated circuit (ASIC), a field-programmable gate array (FPGA), or a combination thereof.

The functions of the receiving direction information acquisition unit 4, the error detection unit 5, and the capture and tracking control unit 6 in the orientation direction control device 2 may be implemented by separate processing circuits, or these functions may be collectively implemented by one processing circuit. In addition, the functions of the orientation direction control information acquisition unit 13, the error value estimation calculation unit 14, the receiving direction information acquisition unit 15, the error detection unit 16, and the capture and tracking control unit 17 in the orientation direction control device 11 may be implemented by separate processing circuits, or these functions may be collectively implemented by one processing circuit.

In a case where the processing circuit is a processor 23 illustrated in FIG. 5B, the functions of the receiving direction information acquisition unit 4, the error detection unit 5, and the capture and tracking control unit 6 in the orientation direction control device 2 are implemented by software, firmware, or a combination of software and firmware. Alternatively, in a case where the processing circuit is the processor 23 illustrated in FIG. 5B, the functions of the orientation direction control information acquisition unit 13, the error value estimation calculation unit 14, the receiving direction information acquisition unit 15, the error detection unit 16, and the capture and tracking control unit 17 in the orientation direction control device 11 are implemented by software, firmware, or a combination of software and firmware.

Note that, the software or the firmware is described as a program and stored in a memory 24.

The processor 23 implements the functions of the receiving direction information acquisition unit 4, the error detection unit 5, and the capture and tracking control unit 6 in the orientation direction control device 2 by reading and executing the program stored in the memory 24. That is, the orientation direction control device 2 includes the memory 24 for storing a program by which the processing from step ST1 to step ST3 illustrated in FIG. 3 is resultantly executed when executed by the processor 23. Alternatively, the processor 23 implements the functions of the orientation direction control information acquisition unit 13, the error value estimation calculation unit 14, the receiving direction information acquisition unit 15, the error detection unit 16, and the capture and tracking control unit 17 in the orientation direction control device 11 by reading and executing the program stored in the memory 24. That is, the orientation direction control device 11 includes the memory 24 for storing a program by which the processing from step ST10 to step ST14 illustrated in FIG. 4 is resultantly executed when executed by the processor 23.

These programs cause a computer to execute procedures or methods performed by the receiving direction information acquisition unit 4, the error detection unit 5, and the capture and tracking control unit 6 in the orientation direction control device 2. The memory 24 may be a computer-readable storage medium in which a program is stored for causing the computer to function as the receiving direction information acquisition unit 4, the error detection unit 5, and the capture and tracking control unit 6 in the orientation direction control device 2. Alternatively, these programs cause a computer to execute procedures or methods performed by the orientation direction control information acquisition unit 13, the error value estimation calculation unit 14, the receiving direction information acquisition unit 15, the error detection unit 16, and the capture and tracking control unit 17 in the orientation direction control device 11. The memory 24 may be a computer-readable storage medium in which a program is stored for causing the computer to function as the orientation direction control information acquisition unit 13, the error value estimation calculation unit 14, the receiving direction information acquisition unit 15, the error detection unit 16, and the capture and tracking control unit 17 in the orientation direction control device 11.

Examples of the memory 24 include a nonvolatile or volatile semiconductor memory such as random access memory (RAM), read only memory (ROM), flash memory, erasable programmable read only memory (EPROM), and electrically-EPROM (EEPROM), a magnetic disk, a flexible disk, an optical disk, a compact disk, a mini disk, a DVD, and the like.

Regarding the functions of the receiving direction information acquisition unit 4, the error detection unit 5, and the capture and tracking control unit 6 in the orientation direction control device 2, some of the functions may be implemented by dedicated hardware, and some of the functions may be implemented by software or firmware.

For example, the receiving direction information acquisition unit 4 and the error detection unit 5 implement the functions by a processing circuit as dedicated hardware. Regarding the capture and tracking control unit 6, the processor 23 may implement the function by reading and executing the program stored in the memory 24.

Alternatively, regarding the functions of the orientation direction control information acquisition unit 13, the error value estimation calculation unit 14, the receiving direction information acquisition unit 15, the error detection unit 16, and the capture and tracking control unit 17 in the orientation direction control device 11, some of the functions may be implemented by dedicated hardware, and some of the functions may be implemented by software or firmware.

For example, the orientation direction control information acquisition unit 13 and the error value estimation calculation unit 14 implement the functions by a processing circuit as dedicated hardware. Regarding the receiving direction information acquisition unit 15, the error detection unit 16, and the capture and tracking control unit 17, the processor 23 may implement the functions by reading and executing the program stored in the memory 24.

As described above, the processing circuit can implement each of the functions by hardware, software, firmware, or a combination thereof.

Figure 6:
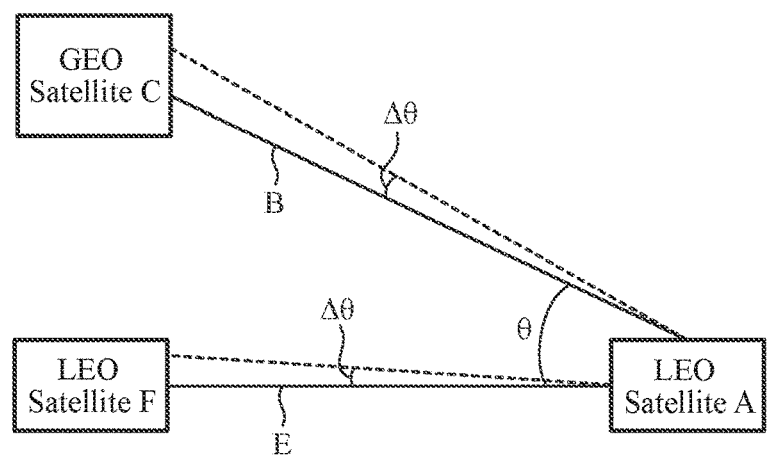
FIG. 6 is a schematic diagram for explaining a specific example of an error value estimation method by the orientation direction control device according to the first embodiment.

Next, a specific example of an error value estimation method in step ST11 described above in the orientation direction control method by the orientation direction control device 11 of the second optical communication terminal 102 according to the first embodiment will be described with reference to the drawings. FIG. 6 is a schematic diagram for explaining a specific example of the error value estimation method by the orientation direction control device 11. Note that, for simplicity of explanation, FIG. 6 illustrates a two-dimensional positional relationship between the satellites described above.

In FIG. 6, $\theta$ is defined as an angle formed by a line (first optical link B) connecting the LEO satellite A with the GEO satellite C and a line (second optical link E) connecting the LEO satellite A with the LEO satellite F. Note that precision capture is assumed to be established between the LEO satellite A and the GEO satellite C.

First, in step ST2 described above, the error detection unit 5 of the orientation direction control device 2 of the first optical communication terminal 101 detects a first error $\Delta\theta$ of the orientation angle at which the transmission/reception unit 1 performs optical communication via the first optical link B, during a certain time interval $\Delta t$. Next, the orientation direction control information acquisition unit 13 acquires the first error $\Delta\theta$ in step ST10 described above.

Note that, since the disturbance of the GEO satellite C is smaller than that of the LEO satellite A, an amount of angular variation due to the disturbance of the LEO satellite A that is a source of the first error $\Delta\theta$ is overwhelmingly larger than an amount of angular variation due to the disturbance of the GEO satellite C that is a source of the first error $\Delta\theta$. For that reason, in the specific example, in step ST11 described above, the error value estimation calculation unit 14 of the second optical communication terminal 102 estimates that the second error of the orientation angle at which the transmission/reception unit 10 performs optical communication via the second optical link E is the same value as the first error $\Delta\theta$ of the orientation angle at which the transmission/reception unit 1 of the first optical communication terminal 101 performs optical communication via the first optical link B. A second error $\Delta\theta$ estimated by the error value estimation calculation unit 14 is used for control of the orientation direction by the capture and tracking control unit 17 in step ST14 described above, whereby the second optical link E between the LEO satellite A and the LEO satellite F is stabilized.

Figure 7:
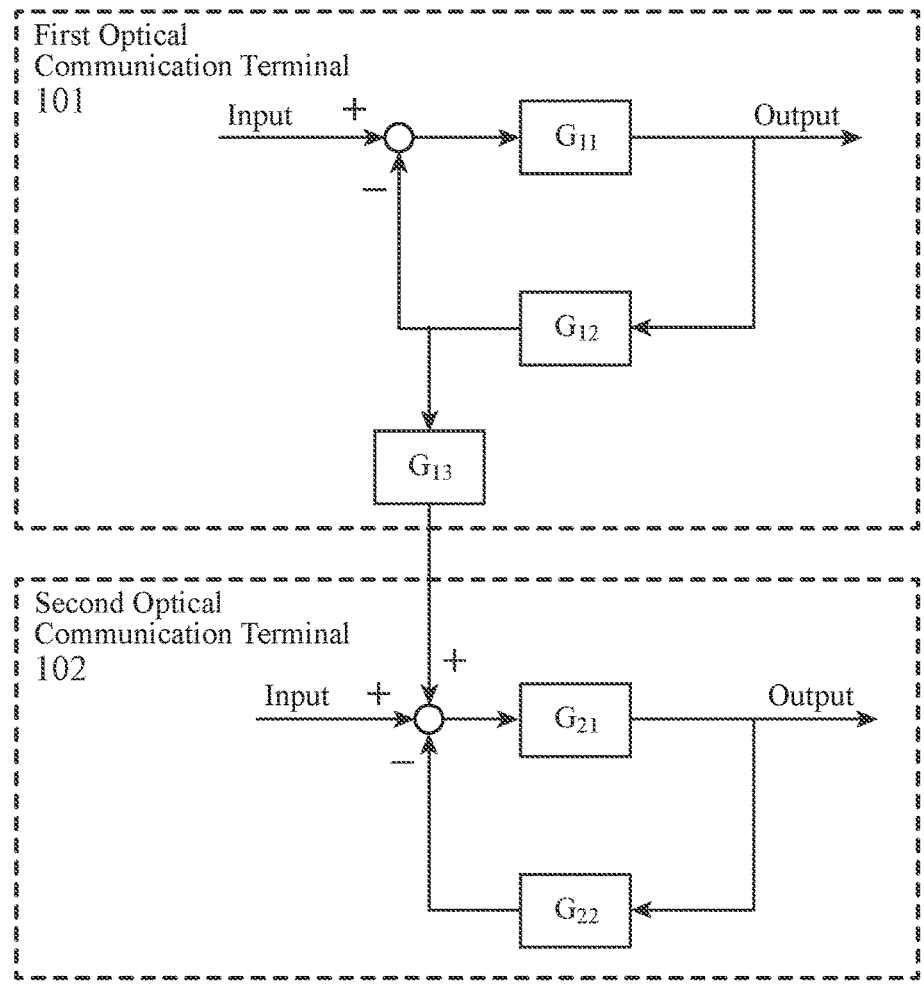
FIG. 7 is a block diagram illustrating a specific example of the orientation direction control method according to the first embodiment.

Next, with reference to a block diagram, a description will be given of specific examples of the orientation direction control method by the orientation direction control device 2 of the first optical communication terminal 101 and the orientation direction control method by the orientation direction control device 11 of the second optical communication terminal 102 according to the first embodiment. FIG. 7 is a block diagram illustrating a specific example of the orientation direction control method according to the first embodiment.

First, in the first optical communication terminal 101, in step ST3 described above, the capture and tracking control unit 6 is assumed to have calculated the amount of control for the capture and tracking mechanism unit 3 by using the target orientation angle (input in FIG. 7) and the first error acquired in advance from the error detection unit 5 as inputs, and G11 as a transfer function, and to have controlled the orientation direction in which the transmission/reception unit 1 performs optical communication via the first optical link B. Then, the capture and tracking mechanism unit 3 performs the capture and tracking for maintaining the first optical link B, by changing the orientation direction of the transmission/reception unit 1, on the basis of the control by the capture and tracking control unit 6 in step ST3. The transmission/reception unit 1 whose orientation direction has been changed by the capture and tracking mechanism unit 3 detects the receiving direction information regarding the direction in which the light is received via the first optical link B, by receiving the light via the first optical link B.

Then, the orientation direction control method by the orientation direction control device 2 is executed again, and in step ST1 described above, the receiving direction information acquisition unit 4 acquires the receiving direction information detected by the transmission/reception unit 1. Next, in step ST2 described above, the error detection unit 5 calculates the first error of the orientation angle at which the transmission/reception unit 1 performs optical communication via the first optical link B, by using the receiving direction information acquired by the receiving direction information acquisition unit 4 as an input, and G12 as a transfer function.

Next, in step ST3 described above, the capture and tracking control unit 6 calculates again the amount of control for the capture and tracking mechanism unit 3 by using the target orientation angle and the first error calculated by the error detection unit 5 as inputs, and G11 as a transfer function, and controls the orientation direction in which the transmission/reception unit 1 performs optical communication via the first optical link B. That is, in the specific example, the control by the capture and tracking control unit 6 is feedback control using the first error as an amount of feedback.

On the other hand, in the second optical communication terminal 102, in step ST14 described above, the capture and tracking control unit 17 is assumed to have controlled the capture and tracking for maintaining the second optical link E, by calculating an amount of control for the capture and tracking mechanism unit 12 by using the target orientation angle, the second error acquired in advance from the error value estimation calculation unit 14, and the third error acquired in advance from the error detection unit 16 as inputs, and G21 as a transfer function, and controlling the orientation direction in which the transmission/reception unit 10 performs optical communication via the second optical link E. Then, the capture and tracking mechanism unit 12 performs the capture and tracking for maintaining the second optical link E, by changing the orientation direction of the transmission/reception unit 10, on the basis of the control by the capture and tracking control unit 17 in step ST14. The transmission/reception unit 10 whose orientation direction has been changed by the capture and tracking mechanism unit 12 detects receiving direction information regarding the direction in which the light is received via the second optical link E, by receiving the light via the second optical link E.

Then, the orientation direction control method by the orientation direction control device 11 is executed again, and in the step ST10 described above, the orientation direction control information acquisition unit 13 acquires the orientation direction control information including the first error calculated by the error detection unit 5 in step ST2 described above. Next, in step ST11 described above, the error value estimation calculation unit 14 calculates the second error of the orientation angle at which the transmission/reception unit 10 performs optical communication via the second optical link E, by using the first error acquired by the orientation direction control information acquisition unit 13 as an input, and G13 as a transfer function.

Next, in step ST12 described above, the receiving direction information acquisition unit 15 acquires the receiving direction information regarding the direction in which the transmission/reception unit 10 receives the light via the second optical link E. Next, in step ST13 described above, the error detection unit 16 calculates the third error of the orientation angle at which the transmission/reception unit 10 performs optical communication via the second optical link E, by using the receiving direction information acquired by the receiving direction information acquisition unit 15 as an input, and G22 as a transfer function.

Next, in step ST14 described above, the capture and tracking control unit 17 controls the capture and tracking for maintaining the second optical link E by calculating the amount of control for the capture and tracking mechanism unit 12 by using the target orientation angle, the second error calculated by the error value estimation calculation unit 14 in step ST11, and the third error calculated by the error detection unit 16 in step ST13 as inputs, and G21 as a transfer function, and controlling the orientation direction in which the transmission/reception unit 10 performs optical communication via the second optical link E. That is, in the specific example, the control by the capture and tracking control unit 6 is control in which feedback control using the third error as an amount of feedback and feedforward control using the second error as an amount of feedforward are used in combination.

Next, a first modification of the first embodiment will be described with reference to the drawings. In the above description, a configuration in which the first optical communication terminal 101 and the second optical communication terminal 102 are installed on the LEO satellite A has been described. In the first modification of the first embodiment, a configuration in which an observation terminal is installed on the LEO satellite A instead of the second optical communication terminal 102 will be described.

Figure 8:
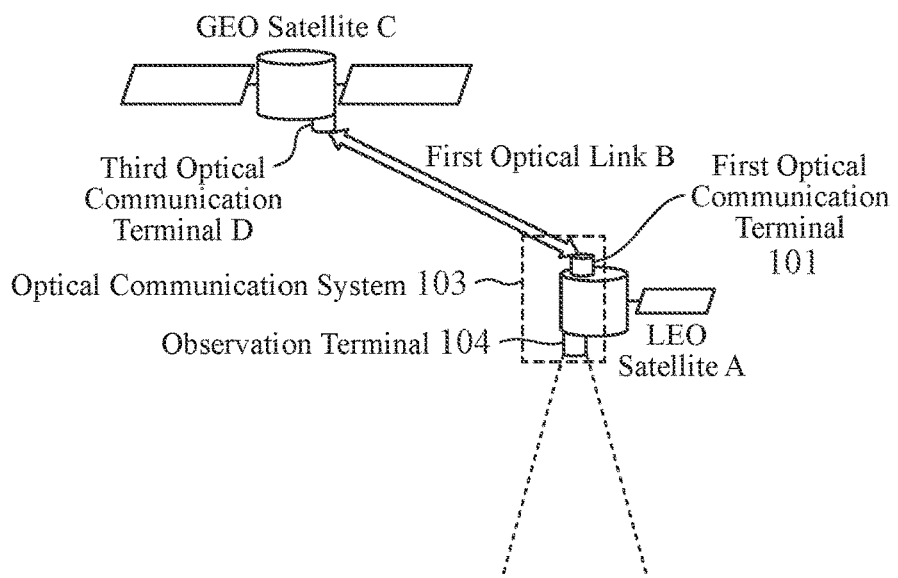
FIG. 8 is a schematic diagram illustrating a state in which an optical communication system according to a first modification of the first embodiment performs optical communication and observation.

FIG. 8 is a schematic diagram illustrating a state in which an optical communication system 103 according to the first modification of the first embodiment performs optical communication and observation. As illustrated in FIG. 8, the optical communication system 103 includes the first optical communication terminal 101 and an observation terminal 104. Note that, a configuration of the first optical communication terminal 101 according to the first modification is similar to a configuration of the first optical communication terminal 101 illustrated in FIG. 2. On the other hand, a configuration of the observation terminal 104 according to the first modification is partially different from the configuration of the second optical communication terminal 102 illustrated in FIG. 2.

The observation terminal 104 observes the Earth by transmitting and receiving light or a radio wave. Examples of the observation terminal 104 include an observation terminal including an optical element for ground imaging, an observation terminal including a radio wave processing device for ground imaging, an observation terminal including a measuring device for measuring atmospheric conditions, or the like. In a case where the observation terminal 104 is any of these observation terminals, a transmission/reception unit corresponding to the transmission/reception unit 10 of the second optical communication terminal 102 in the observation terminal 104 includes the optical element for ground imaging, the radio wave processing device for ground imaging, or the measuring device for measuring atmospheric conditions. The transmission/reception unit may detect receiving direction information regarding a direction in which the light or the radio wave is received, by a method similar to the method described above in which the transmission/reception unit 10 of the second optical communication terminal 102 detects receiving direction information. Alternatively, the transmission/reception unit may detect the receiving direction information regarding the direction in which the light or the radio wave is received, by transmitting the light or the radio wave toward the Earth and receiving the reflected light or radio wave.

An orientation direction control unit corresponding to the capture and tracking control unit 17 of the second optical communication terminal 102 in the observation terminal 104 controls an orientation direction in which the transmission/reception unit of the observation terminal 104 transmits and receives the light or the radio wave, on the basis of the first error acquired by the orientation direction control information acquisition unit 13. More specifically, the orientation direction control unit controls the orientation direction in which the transmission/reception unit of the observation terminal 104 transmits and receives the light or the radio wave, on the basis of the second error estimated on the basis of the first error by the error value estimation calculation unit 14. Further more specifically, the orientation direction control unit controls the orientation direction in which the transmission/reception unit of the observation terminal 104 transmits and receives the light or the radio wave, further on the basis of the third error detected by the error detection unit 16.

In addition, a mechanism unit corresponding to the capture and tracking mechanism unit 12 of the second optical communication terminal 102 in the observation terminal 104 adjusts an observation direction by changing the orientation direction of the transmission/reception unit 10 on the basis of control by the orientation direction control unit.

As described above, the orientation direction control device 11 according to the first embodiment can be applied to the observation terminal 104 by partially changing its configuration.

Next, a second modification of the first embodiment will be described with reference to the drawings. In the first embodiment, a configuration has been described in which the orientation direction control device 11 of the second optical communication terminal 102 controls the orientation direction on the basis of the first error acquired from the orientation direction control device 2 of the first optical communication terminal 101. In the second modification, an example will be further described in which the orientation direction control device 2 of the first optical communication terminal 101 has a configuration similar to the described configuration.

Figure 9:
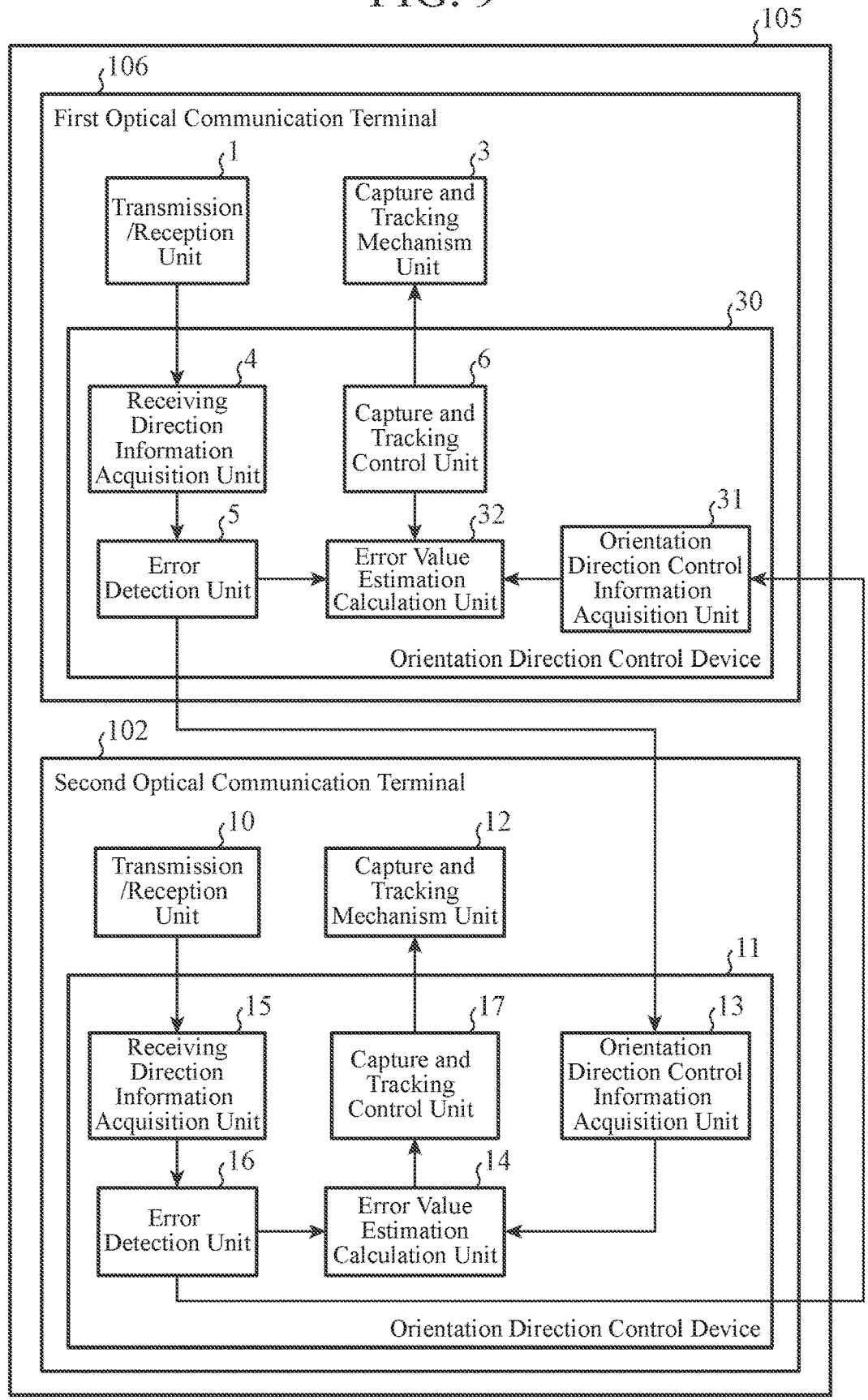
FIG. 9 is a block diagram illustrating a configuration of an optical communication system according to a second modification of the first embodiment.

FIG. 9 is a block diagram illustrating a configuration of an optical communication system 105 according to the second modification of the first embodiment. As illustrated in FIG. 9, an orientation direction control device 30 of a first optical communication terminal 106 according to the second modification further includes an orientation direction control information acquisition unit 31 and an error value estimation calculation unit 32 as compared with the orientation direction control device 2 described above.

The orientation direction control information acquisition unit 31 acquires the third error detected by the error detection unit 16 of the second optical communication terminal 102. The error value estimation calculation unit 32 estimates a fourth error of the orientation angle at which the transmission/reception unit 1 performs optical communication via the first optical link B, on the basis of the third error acquired by the orientation direction control information acquisition unit 31.

The capture and tracking control unit 6 according to the second modification controls the capture and tracking for maintaining the first optical link B, by controlling the orientation direction in which the transmission/reception unit 1 performs optical communication via the first optical link B, further on the basis of the fourth error estimated on the basis of the third error by the error value estimation calculation unit 32.

According to the configuration of the second modification, the capture and tracking capability for maintaining the first optical link B by the first optical communication terminal 101 is improved.

As described above, the orientation direction control device 11 according to the first embodiment is the orientation direction control device 11 to control an orientation direction in which, in a satellite on which the first optical communication terminal 101 as the first transmission/reception device to transmit and receive the light and the second optical communication terminal 102 as the second transmission/reception device to transmit and receive the light or the radio wave are installed, the second transmission/reception device transmits and receives the light or the radio wave, and includes: the orientation direction control information acquisition unit 13 to acquire the orientation direction control information for controlling the orientation direction in which the first transmission/reception device transmits and receives the light; and the capture and tracking control unit 17 as the orientation direction control unit to control the orientation direction in which the second transmission/reception device transmits and receives the light or the radio wave, on the basis of the orientation direction control information acquired by the orientation direction control information acquisition unit 13.

Since the first transmission/reception device and the second transmission/reception device are installed on the same satellite, there is a correlation between the orientation direction of the first transmission/reception device and the orientation direction of the second transmission/reception device. Thus, according to the above configuration, it is possible to maintain the accuracy of the orientation direction of the second transmission/reception device, by controlling the orientation direction in which the second transmission/reception device transmits and receives the light or the radio wave, on the basis of the orientation direction control information of the first transmission/reception device. In addition, for example, also in another transmission/reception device other than the first transmission/reception device and the second transmission/reception device, an orientation direction in which the other transmission/reception device transmits and receives light or a radio wave may be controlled on the basis of the orientation direction control information of the first transmission/reception device. That is, it is possible to maintain the accuracy of the orientation direction without providing equipment such as a high-performance sensor, for at least one or more transmission/reception devices among multiple transmission/reception devices installed on a satellite. In addition, as a result, it is possible to reduce cost of equipment of the transmission/reception device.

In addition, in the orientation direction control device 11 according to the first embodiment, the first transmission/reception device is the first optical communication terminal 101 to perform optical communication via the first optical link B, the second transmission/reception device is the second optical communication terminal 102 to perform optical communication via the second optical link E, the orientation direction control information acquired by the orientation direction control information acquisition unit 13 includes the first error of the orientation angle at which the first optical communication terminal 101 performs optical communication via the first optical link B, and the orientation direction control unit is the capture and tracking control unit 17 to control the capture and tracking for maintaining the second optical link E, by controlling the orientation direction in which the second optical communication terminal 102 performs optical communication via the second optical link E, on the basis of the first error acquired by the orientation direction control information acquisition unit 13.

According to the above configuration, it is possible to correct deviation in the orientation direction of the second optical communication terminal 102 due to the disturbance of the LEO satellite A, or the like, and maintain the accuracy of the orientation of the second optical communication terminal 102, by controlling the orientation direction of the second optical communication terminal 102, on the basis of the first error of the orientation angle of the first optical communication terminal 101. That is, it is possible to maintain the accuracy of the orientation direction without providing equipment such as a high-performance sensor, for at least one or more optical communication terminals among a plurality of optical communication terminals installed on a satellite.

In addition, the orientation direction control device 11 according to the first embodiment further includes the error value estimation calculation unit 14 to estimate the second error of the orientation angle at which the second optical communication terminal 102 performs optical communication via the second optical link E, on the basis of the first error acquired by the orientation direction control information acquisition unit 13, in which the capture and tracking control unit 17 controls the capture and tracking for maintaining the second optical link E, by controlling the orientation direction in which the second optical communication terminal 102 performs optical communication via the second optical link E, on the basis of the second error estimated on the basis of the first error by the error value estimation calculation unit 14.

According to the above configuration, the second error of the orientation angle of the second optical communication terminal 102 is estimated on the basis of the first error of the orientation angle of the first optical communication terminal 101, and the orientation direction of the second optical communication terminal 102 is controlled on the basis of the second error. As a result, the orientation direction of the second optical communication terminal 102 can be suitably controlled.

In addition, the orientation direction control device 11 according to the first embodiment further includes: the receiving direction information acquisition unit 15 to acquire the receiving direction information regarding the direction in which the second optical communication terminal 102 receives the light via the second optical link E; and the error detection unit 16 to detect the third error of the orientation angle at which the second optical communication terminal 102 performs optical communication via the second optical link E, by referring to the receiving direction information acquired by the receiving direction information acquisition unit 15, in which the capture and tracking control unit 17 controls the capture and tracking for maintaining the second optical link E, by controlling the orientation direction in which the second optical communication terminal 102 performs optical communication via the second optical link E, further on the basis of the third error detected by the error detection unit 16.

According to the above configuration, the orientation direction of the second optical communication terminal 102 is controlled, further on the basis of the third error of the orientation direction of the second optical communication terminal 102. As a result, the accuracy of the orientation direction of the second optical communication terminal 102 can be suitably maintained.

In addition, in the orientation direction control device 11 according to the first embodiment, the first transmission/reception device is the first optical communication terminal 101 to perform optical communication via the first optical link B, the second transmission/reception device is the observation terminal 104 to observe the Earth by transmitting and receiving the light or the radio wave, the orientation direction control information acquired by the orientation direction control information acquisition unit 13 is an error of the orientation angle at which the first optical communication terminal 101 performs optical communication via the first optical link B, and the capture and tracking control unit 17 as the orientation direction control unit controls the orientation direction in which the observation terminal 104 transmits and receives the light or the radio wave, on the basis of the error acquired by the orientation direction control information acquisition unit 13.

According to the above configuration, it is possible to maintain the accuracy of the orientation direction of the observation terminal 104 without providing equipment such as a high-performance sensor, by controlling the orientation direction of the observation terminal 104, on the basis of the first error of the orientation angle of the first optical communication terminal 101.

In addition, the second optical communication terminal 102 according to the first embodiment includes: the orientation direction control device 11; the transmission/reception unit 10 (second optical communication terminal transmission/reception unit) to detect the receiving direction information of the second optical communication terminal 102 by receiving the light via the second optical link E; and the capture and tracking mechanism unit 12 (second optical communication terminal capture and tracking mechanism unit) to perform the capture and tracking for maintaining the second optical link E, by changing the orientation direction of the transmission/reception unit 10, on the basis of the control by the capture and tracking control unit 17.

According to the above configuration, it is possible to detect the third error of the orientation angle at which the second optical communication terminal 102 performs optical communication via the second optical link E, by referring to the receiving direction information detected by the transmission/reception unit 10. Then, the capture and tracking mechanism unit 12 changes the orientation direction of the transmission/reception unit 10 by control based on the third error by the capture and tracking control unit 17, whereby the accuracy of the orientation direction of the second optical communication terminal 102 can be suitably maintained.

In addition, the optical communication system 100 according to the first embodiment includes the second optical communication terminal 102 and the first optical communication terminal 101, and the first optical communication terminal 101 includes: the transmission/reception unit 1 (first optical communication terminal transmission/reception unit) to detect the receiving direction information regarding the direction in which the light is received via the first optical link B, by receiving the light via the first optical link B; the receiving direction information acquisition unit 4 (first optical communication terminal receiving direction information acquisition unit) to acquire the receiving direction information detected by the transmission/reception unit 1; the error detection unit 5 (first optical communication terminal error detection unit) to detect the first error of the orientation angle at which the first optical communication terminal 101 performs optical communication via the first optical link B, by referring to the receiving direction information acquired by the receiving direction information acquisition unit 4; the capture and tracking control unit 6 (first optical communication terminal capture and tracking control unit) to control the capture and tracking for maintaining the first optical link B, by controlling the orientation direction in which the first optical communication terminal 101 performs optical communication via the first optical link B, on the basis of the first error detected by the error detection unit 5; and the capture and tracking mechanism unit 3 (first optical communication terminal capture and tracking mechanism unit) to perform the capture and tracking for maintaining the first optical link B, by changing the orientation direction of the transmission/reception unit 1, on the basis of the control by the capture and tracking control unit 6.

According to the above configuration, it is possible to suitably maintain the accuracy of the orientation direction of the second optical communication terminal 102 by controlling the orientation direction of the second optical communication terminal 102 on the basis of the first error detected by the error detection unit 5 of the first optical communication terminal 101. In addition, the first optical communication terminal 101 can suitably maintain the accuracy of the orientation direction by controlling the orientation direction of the transmission/reception unit 1 of the first optical communication terminal 101 on the basis of the first error detected by the error detection unit 5.

In addition, the first optical communication terminal 106 in the optical communication system 105 according to the first embodiment further includes: the orientation direction control information acquisition unit 31 (first optical communication terminal orientation direction control information acquisition unit) to acquire the third error detected by the error detection unit 16 of the second optical communication terminal 102; and the error value estimation calculation unit 32 (first optical communication terminal error value estimation calculation unit) to estimate the fourth error of the orientation angle at which the transmission/reception unit 1 performs optical communication via the first optical link B, on the basis of the third error acquired by the orientation direction control information acquisition unit 31, in which the capture and tracking control unit 6 controls the capture and tracking for maintaining the first optical link B, by controlling the orientation direction in which the transmission/reception unit 1 performs optical communication via the first optical link B, further on the basis of the fourth error estimated on the basis of the third error by the error value estimation calculation unit 32.

According to the above configuration, it is possible to maintain the accuracy of the orientation direction of the first optical communication terminal 101, without providing equipment such as a high-performance sensor, by controlling the orientation direction of the transmission/reception unit 1 of the first optical communication terminal 101, on the basis of the third error of the orientation angle of the second optical communication terminal 102.

In addition, the orientation direction control method according to the first embodiment is an orientation direction control method for controlling the orientation direction in which, in the satellite on which the first optical communication terminal 101 as the first transmission/reception device to transmit and receive the light and the second optical communication terminal 102 as the second transmission/reception device to transmit and receive the light or the radio wave are installed, the second transmission/reception device transmits and receives the light or the radio wave, and the orientation control method includes: an orientation direction control information acquisition step of acquiring the orientation direction control information for controlling the orientation direction in which the first transmission/reception device transmits and receives the light; and an orientation direction control step of controlling the orientation direction in which the second transmission/reception device transmits and receives the light or the radio wave, on the basis of the orientation direction control information acquired in the orientation direction control information acquisition step.

According to the above configuration, an effect is obtained similar to that obtained due to the orientation direction control device 11 according to the first embodiment.

Second Embodiment

As typified by a LEO constellation, there is an application in which an optical communication terminal of a single satellite communicates with optical communication terminals of multiple satellites and switches communication targets (Starlink of SpaceX, or the like). In such an application, communication between the optical communication terminals is interrupted during a time required for the optical communication terminal to capture when switching the communication targets, which is a factor of lowering an operating ratio of the optical communication terminal. For that reason, being able to shorten the time for switching the communication targets means that an amount of communication between the satellites can be increased.

There is a spiral scan method as a method in which the optical communication terminal captures a signal in optical communication between the satellites (for example, see Yoshinori Arimoto, "Recent Technological Trend in Optical Space Communications", KOGAKU, Vol. 35, No. 9 (2006) URL: https://annex.jsap.or.jp/photonics/kogaku/public/35-09-kaisetsu3.pdf). In this method, an optical communication terminal installed on one satellite fixes its orientation direction, and an optical communication terminal installed on the other satellite scans the orientation direction in a spiral manner, whereby mutual orientation directions are gradually aligned on the basis of orientation directions of a moment they are captured in a communication field of view. In such a method, in the optical communication terminal, its scan range changes depending on how far a direction can be specified in which a satellite to be communicated is present. Narrowing the scan range leads to shortening in the time required for capture. In a second embodiment, one orientation direction control device controls the orientation direction, further on the basis of an orientation angle for control used by the other orientation direction control device, in addition to the configuration of the first embodiment, whereby the time required for capture is shortened.

Hereinafter, the second embodiment will be described with reference to the drawings. Note that, the same reference numerals are given to the components having functions similar to those described in the first embodiment, and the description thereof will be omitted.

Figure 10:
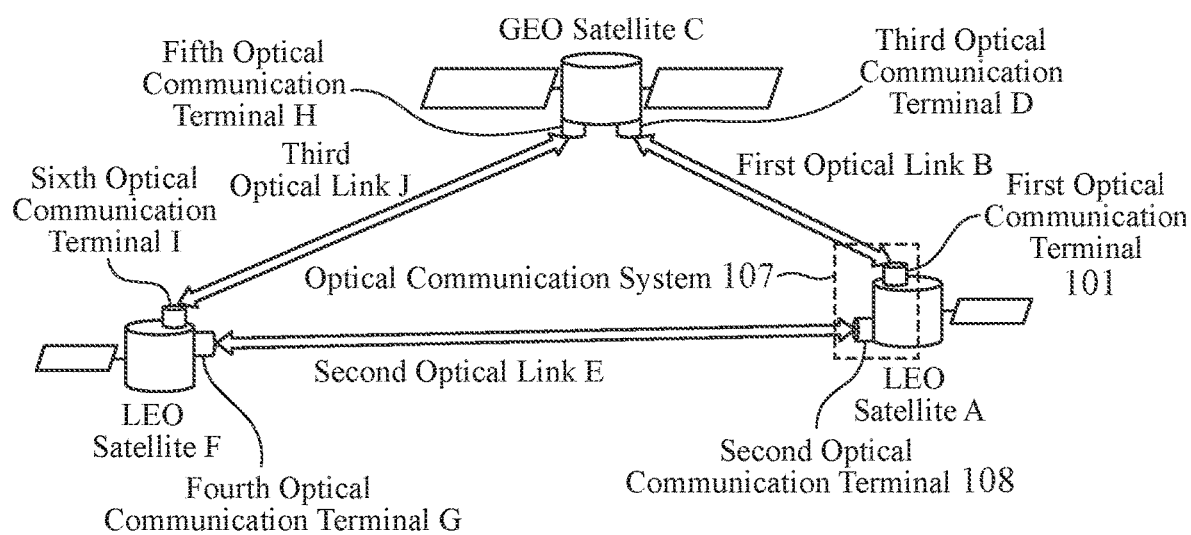
FIG. 10 is a schematic diagram illustrating a state in which an optical communication system according to a second embodiment performs optical communication.

FIG. 10 is a schematic diagram illustrating a state in which the optical communication system 107 according to the second embodiment performs optical communication. As illustrated in FIG. 10, the optical communication system 107 includes the first optical communication terminal 101 and a second optical communication terminal 108.

The first optical communication terminal 101 and the second optical communication terminal 108 each are installed on the LEO satellite A. As described above, the first optical communication terminal 101 performs optical communication with the third optical communication terminal D installed on the GEO satellite C via the first optical link B. In addition, the second optical communication terminal 108 performs optical communication with the fourth optical communication terminal G installed on the LEO satellite F via the second optical link E. Note that, as described above, the GEO satellite C is a satellite that is stable and has a low disturbance as compared with the LEO satellite A and the LEO satellite F. In addition, a fifth optical communication terminal H is installed on the GEO satellite C, and a sixth optical communication terminal I is installed on the LEO satellite F. The fifth optical communication terminal H and the sixth optical communication terminal I communicate with each other via a third optical link J.

Figure 11:
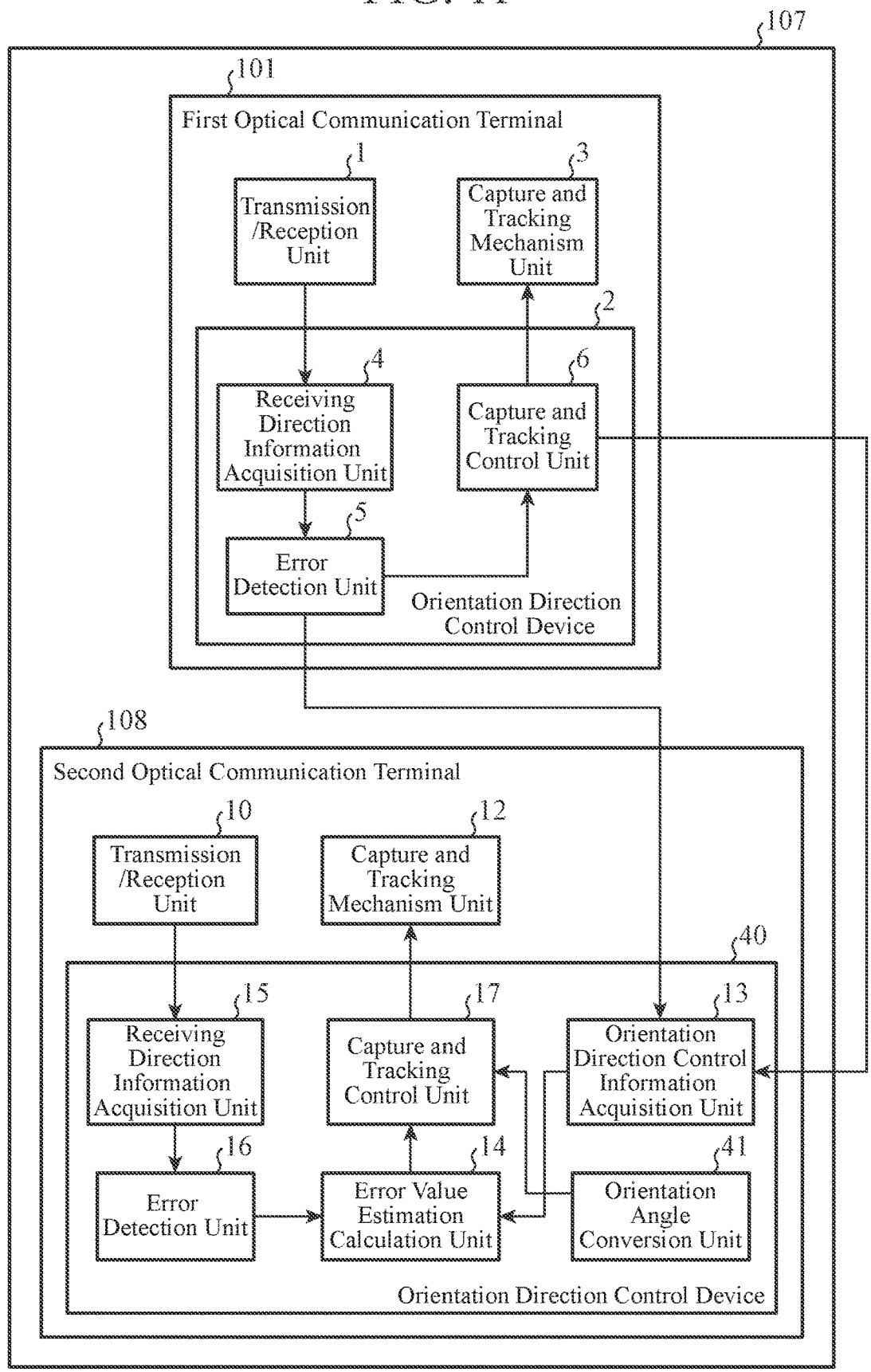
FIG. 11 is a block diagram illustrating a configuration of the optical communication system according to the second embodiment.

FIG. 11 is a block diagram illustrating a configuration of the optical communication system 107 according to the second embodiment. Compared with the optical communication system 100 according to the first embodiment, the optical communication system 107 includes the second optical communication terminal 108 instead of the second optical communication terminal 102. Compared with the second optical communication terminal 102 according to the first embodiment, in the second optical communication terminal 108, an orientation direction control device 40 further includes an orientation angle conversion unit 41.

The orientation direction control information acquisition unit 13 according to the second embodiment further acquires a first orientation angle for control used for controlling the orientation direction in which the first optical communication terminal 101 performs optical communication via the first optical link B, as the orientation direction control information. More specifically, the orientation direction control information acquisition unit 13 further acquires the first orientation angle for control used for controlling the orientation direction in which the first optical communication terminal 101 performs optical communication via the first optical link B, as the orientation direction control information, from the capture and tracking control unit 6 of the orientation direction control device 2 of the first optical communication terminal 101. The orientation direction control information acquisition unit 13 outputs the acquired first orientation angle to the orientation angle conversion unit 41.

The orientation angle conversion unit 41 converts the first orientation angle acquired by the orientation direction control information acquisition unit 13 to a second orientation angle for control used for controlling an orientation direction in which the second optical communication terminal 108 performs optical communication via the second optical link E, and outputs the converted second orientation angle to the capture and tracking control unit 17.

The capture and tracking control unit 17 according to the second embodiment controls the capture and tracking for maintaining the second optical link E, by controlling the orientation direction in which the second optical communication terminal 108 performs optical communication via the second optical link E, further on the basis of the first orientation angle acquired by the orientation direction control information acquisition unit 13. More specifically, in the second embodiment, the capture and tracking control unit 17 controls the capture and tracking for maintaining the second optical link E, by controlling the orientation direction in which the transmission/reception unit 10 performs optical communication via the second optical link E, further on the basis of the second orientation angle converted on the basis of the first orientation angle by the orientation angle conversion unit 41.

The capture and tracking control unit 17 according to the second embodiment may estimate a position of the second optical communication terminal 108 on the basis of the second orientation angle converted on the basis of the first orientation angle by the orientation angle conversion unit 41, and orbit information regarding an orbit of the LEO satellite A. In that case, the capture and tracking control unit 17 may control the capture and tracking for maintaining the second optical link E, by controlling the position where the transmission/reception unit 10 performs optical communication via the second optical link E, on the basis of the estimated position.

Next, operation of the orientation direction control device 40 of the second optical communication terminal 108 according to the second embodiment will be described with reference to the drawings. Note that, operation of the orientation direction control device 2 of the first optical communication terminal 101 according to the second embodiment is similar to the operation of the orientation direction control device 2 described in the first embodiment except that the capture and tracking control unit 6 outputs the first orientation angle for control used for controlling the orientation direction in which the first optical communication terminal 101 performs optical communication via the first optical link B, to the orientation direction control information acquisition unit 13 of the orientation direction control device 40 of the second optical communication terminal 108. For that reason, a description will be omitted of the operation of the orientation direction control device 2 of the first optical communication terminal 101 according to the second embodiment.

Figure 12:
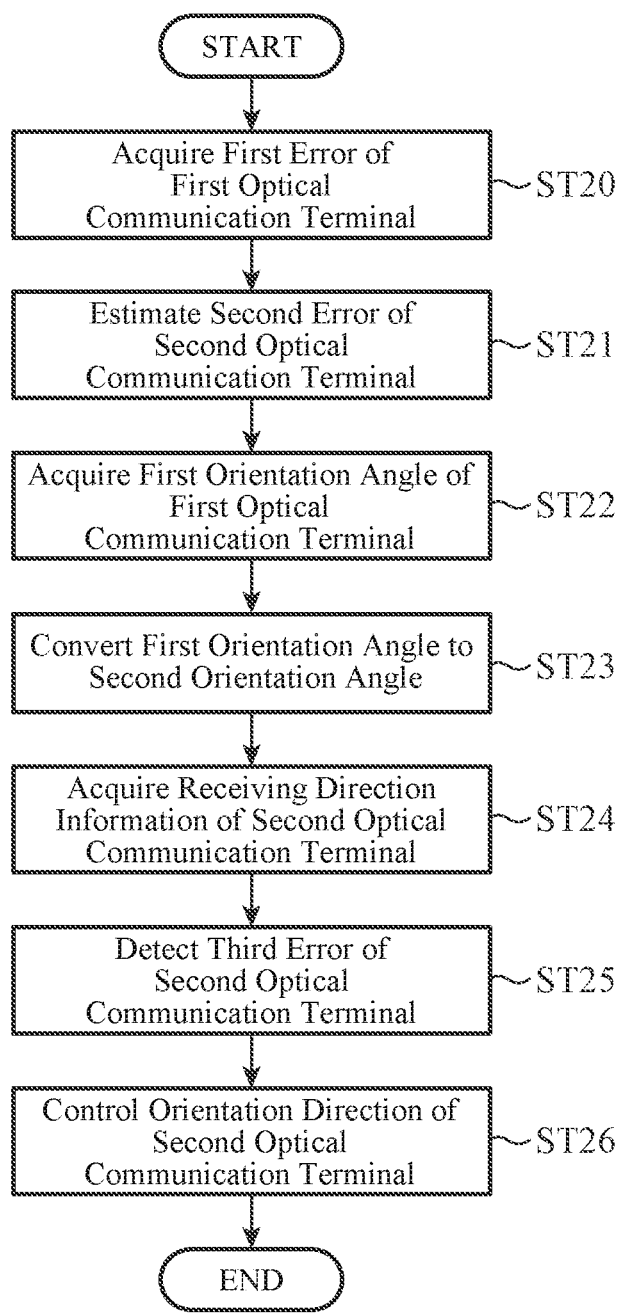
FIG. 12 is a flowchart illustrating an orientation direction control method by an orientation direction control device according to the second embodiment.

FIG. 12 is a flowchart illustrating an orientation direction control method by the orientation direction control device 40. Note that, before the following orientation direction control method is implemented, the transmission/reception unit 10 is assumed to detect the receiving direction information regarding the direction in which light is received via the second optical link E, by receiving the light via the second optical link E.

As illustrated in FIG. 12, the orientation direction control information acquisition unit 13 acquires the orientation direction control information including the first error of the orientation angle at which the transmission/reception unit 1 of the first optical communication terminal 101 performs optical communication via the first optical link B, from the error detection unit 5 of the orientation direction control device 2 of the first optical communication terminal 101 (step ST20). The orientation direction control information acquisition unit 13 outputs the acquired orientation direction control information to the error value estimation calculation unit 14.

Next, the error value estimation calculation unit 14 estimates the second error of the orientation angle at which the transmission/reception unit 10 performs optical communication via the second optical link E, on the basis of the first error acquired by the orientation direction control information acquisition unit 13 (step ST21).

Next, the orientation direction control information acquisition unit 13 further acquires the first orientation angle for control used for controlling the orientation direction in which the first optical communication terminal 101 performs optical communication via the first optical link B, as the orientation direction control information, from the capture and tracking control unit 6 of the orientation direction control device 2 of the first optical communication terminal 101 (step ST22). The orientation direction control information acquisition unit 13 outputs the acquired first orientation angle to the orientation angle conversion unit 41.

Next, the orientation angle conversion unit 41 converts the first orientation angle acquired by the orientation direction control information acquisition unit 13 to the second orientation angle for control used for controlling the orientation direction in which the second optical communication terminal 108 performs optical communication via the second optical link E (step ST23). The orientation angle conversion unit 41 outputs the converted second orientation angle to the capture and tracking control unit 17.

Next, the receiving direction information acquisition unit 15 acquires the receiving direction information regarding the direction in which the transmission/reception unit 10 receives the light via the second optical link E (step ST24). The receiving direction information acquisition unit 15 outputs the acquired receiving direction information to the error detection unit 16.

Next, the error detection unit 16 detects the third error of the orientation angle at which the transmission/reception unit 10 performs optical communication via the second optical link E, by referring to the receiving direction information acquired by the receiving direction information acquisition unit 15 (step ST25). The error detection unit 16 outputs the detected third error to the error value estimation calculation unit 14. The error value estimation calculation unit 14 outputs the second error estimated in step ST21 and the third error acquired from the error detection unit 16 to the capture and tracking control unit 17.

The capture and tracking control unit 17 controls the capture and tracking for maintaining the second optical link E, by controlling the orientation direction in which the transmission/reception unit 10 performs optical communication via the second optical link E, on the basis of the second error estimated on the basis of the first error by the error value estimation calculation unit 14 in step ST21, the second orientation angle converted by the orientation angle conversion unit 41 in step ST23, and the third error detected by the error detection unit 16 in step ST25 (step ST26).

The capture and tracking mechanism unit 12 performs the capture and tracking for maintaining the second optical link E, by changing the orientation direction of the transmission/reception unit 10, on the basis of the control by the capture and tracking control unit 17 in step ST26. The transmission/reception unit 10 whose orientation direction has been changed by the capture and tracking mechanism unit 12 detects the receiving direction information regarding the direction in which the light is received via the second optical link E, by receiving the light via the second optical link E again. Then, the orientation direction control device 40 executes steps ST20 to ST26 described above again. The second optical communication terminal 108 performs the capture and tracking for maintaining the second optical link E by repeating the operation described above.

Note that, functions of the orientation direction control information acquisition unit 13, the error value estimation calculation unit 14, the receiving direction information acquisition unit 15, the error detection unit 16, the capture and tracking control unit 17, and the orientation angle conversion unit 41 in the orientation direction control device 40 according to the second embodiment are implemented by a processing circuit. That is, the orientation direction control device 40 according to the second embodiment includes the processing circuit for executing the processing from step ST20 to step ST26 illustrated in FIG. 12. The processing circuit may be dedicated hardware, or a central processing unit (CPU) for executing a program stored in a memory. A hardware configuration for implementing a function of the orientation direction control device 40 according to the second embodiment is similar to the hardware configuration illustrated in FIG. 5A. In addition, a hardware configuration for executing software for implementing the function of the orientation direction control device 40 according to the second embodiment is similar to the hardware configuration illustrated in FIG. 5B.

Figure 13:
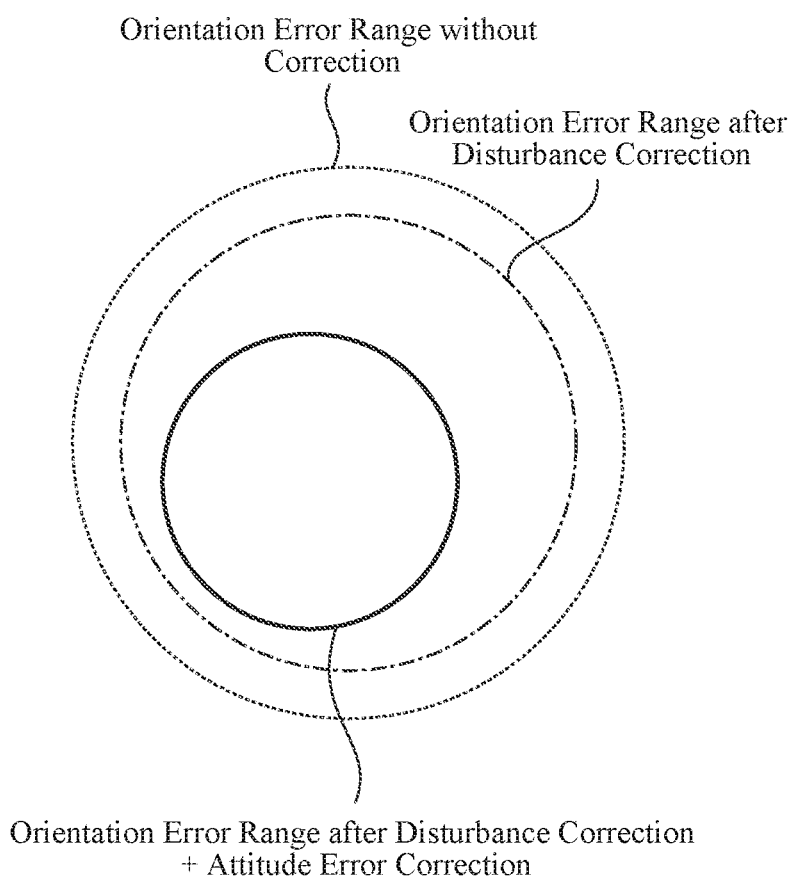
FIG. 13 is a diagram for explaining an effect of the orientation direction control method by the orientation direction control device according to the second embodiment.

Next, an effect of the orientation direction control method by the orientation direction control device 40 according to the second embodiment will be described with reference to the drawings. FIG. 13 is a diagram for explaining the effect of the orientation direction control method by the orientation direction control device 40.

In step ST26 described above, first, the capture and tracking control unit 17 controls the capture and tracking for maintaining the second optical link E, by controlling the orientation direction in which the transmission/reception unit 10 performs optical communication via the second optical link E, on the basis of the second error estimated on the basis of the first error by the error value estimation calculation unit 14 in step ST21. As a result, influence due to the disturbance of the LEO satellite A is suppressed and an error range of the orientation angle is narrowed (one-dot chain line in FIG. 13), so that the scan range when the second optical communication terminal 108 performs a spiral scan or the like is narrowed.

On the other hand, there is a problem that the orientation direction of the second optical communication terminal 108 deviates not only due to the disturbance of the LEO satellite A but also due to an attitude error of the LEO satellite A. Thus, in step ST26 described above, the capture and tracking control unit 17 controls the capture and tracking for maintaining the second optical link E, by controlling the orientation direction in which the transmission/reception unit 10 performs optical communication via the second optical link E, on the basis of the second orientation angle converted by the orientation angle conversion unit 41 in step ST23. As a result, it is possible to correct the deviation in the orientation direction of the second optical communication terminal 102 due to the attitude error of the LEO satellite A, so that it is possible to narrow the scan range as illustrated by the solid line in FIG. 13.

The above configuration is also applicable to the LEO satellite F. In addition, it is also effective when the LEO satellite A includes three or more optical communication terminals. For example, the LEO satellite A establishes a link with a plurality of low-disturbance satellites, and the orientation direction control device 40 controls the orientation direction further on the basis of the orientation angle for control used for control the orientation direction in which each optical communication terminal (not illustrated) with established links with the plurality of low-disturbance satellites performs optical communication, whereby an estimation range after correction of the attitude error can be further narrowed. Thus, it is effective in shortening the time required for capture.

As described above, in the orientation direction control device 40 according to the second embodiment, the orientation direction control information acquired by the orientation direction control information acquisition unit 13 further includes the first orientation angle for control used for controlling the orientation direction in which the first optical communication terminal 101 performs optical communication via the first optical link B, and the capture and tracking control unit 17 controls the capture and tracking for maintaining the second optical link E, by controlling the orientation direction in which the second optical communication terminal 108 performs optical communication via the second optical link E, further on the basis of the first orientation angle acquired by the orientation direction control information acquisition unit 13.

According to the above configuration, it is possible to correct the deviation in the orientation direction of the second optical communication terminal 108 due to the attitude error of the LEO satellite A, and it is possible to maintain the accuracy of the orientation direction of the second optical communication terminal 108, by controlling the orientation direction in which the second optical communication terminal 108 performs optical communication via the second optical link E, further on the basis of the first orientation angle for control in the first optical communication terminal 101. In addition, the scan range when the second optical communication terminal 108 performs a spiral scan or the like is narrowed.

In addition, the orientation direction control device 40 according to the second embodiment further includes the orientation angle conversion unit 41 to convert the first orientation angle acquired by the orientation direction control information acquisition unit 13 to the second orientation angle for control used for controlling the orientation direction in which the second optical communication terminal 108 performs optical communication via the second optical link E, and the capture and tracking control unit 17 controls the capture and tracking for maintaining the second optical link E, by controlling the orientation direction in which the second optical communication terminal 108 performs optical communication via the second optical link E, further on the basis of the second orientation angle converted on the basis of the first orientation angle by the orientation angle conversion unit 41.

According to the above configuration, it is possible to correct the deviation in the orientation direction of the second optical communication terminal 108 due to the attitude error of the LEO satellite A, and it is possible to suitably maintain the accuracy of the orientation direction of the second optical communication terminal 108, by controlling the orientation direction in which the second optical communication terminal 108 performs optical communication via the second optical link E, further on the basis of the converted second orientation angle.

Note that, free combination of each embodiment, a modification of any component of each embodiment, or omission of any component in each embodiment is possible.

INDUSTRIAL APPLICABILITY

The orientation direction control device according to the present disclosure can maintain the accuracy of the orientation direction without providing equipment such as a high-performance sensor, for at least one or more transmission/reception devices among multiple transmission/reception devices installed on a satellite, so that the orientation direction control device can be used for optical communication systems.

REFERENCE SIGNS LIST

1: Transmission/reception unit, 2: Orientation direction control device, 3: Capture and tracking mechanism unit, 4: Receiving direction information acquisition unit, 5: Error detection unit, 6: Capture and tracking control unit, 10: Transmission/reception unit, 11: Orientation direction control device, 12: Capture and tracking mechanism unit, 13: Orientation direction control information acquisition unit, 14: Error value estimation calculation unit, 15: Receiving direction information acquisition unit, 16: Error detection unit, 17: Capture and tracking control unit, 20: Processing circuitry, 21: Transmission/reception device, 22: Capture and tracking mechanism, 23: Processor, 24: Memory, 30: Orientation direction control device, 31: Orientation direction control information acquisition unit, 32: Error value estimation calculation unit, 40: Orientation direction control device, 41: Orientation angle conversion unit, 100: Optical communication system, 101: First optical communication terminal, 102: Second optical communication terminal, 103: Optical communication system, 104: Observation terminal, 105: Optical communication system, 106: First optical communication terminal, 107: Optical communication system, 108: Second optical communication terminal

What is claimed is:

1. An orientation direction control device to control an orientation direction in which, in a satellite on which a first transmission/reception device to transmit and receive light and a second transmission/reception device to transmit and receive light or a radio wave are installed, the second transmission/reception device transmits and receives the light or the radio wave, the orientation direction control device comprising:

processing circuitry
to acquire orientation direction control information for controlling an orientation direction in which the first transmission/reception device transmits and receives the light, and
to control the orientation direction in which the second transmission/reception device transmits and receives the light or the radio wave, on a basis of the acquired orientation direction control information, wherein
the first transmission/reception device is a first optical communication terminal to perform optical communication with a first object via a first optical link,
the second transmission/reception device is a second optical communication terminal to perform optical communication with a second object via a second optical link,
the acquired orientation direction control information includes a first error defined as a difference between an orientation angle at which the first optical communication terminal performs optical communication with the first object via the first optical link and a target orientation angle, and
the processing circuitry calculates the first error, and controls capture and tracking for maintaining the second optical link, by controlling an orientation direction in which the second optical communication terminal performs optical communication via the second optical link, on a basis of the acquired first error.

2. The orientation direction control device according to claim 1, wherein the processing circuitry
estimates a second error of an orientation angle at which the second optical communication terminal performs optical communication via the second optical link, on the basis of the acquired first error, and controls the capture and tracking for maintaining the second optical link, by controlling the orientation direction in which the second optical communication terminal performs optical communication via the second optical link, on a basis of the second error estimated on the basis of the first error.

3. The orientation direction control device according to claim 2, wherein the processing circuitry
   acquires receiving direction information regarding a direction in which the second optical communication terminal receives light via the second optical link,
   detects a third error of the orientation angle at which the second optical communication terminal performs optical communication via the second optical link by referring to the acquired receiving direction information, and
   controls the capture and tracking for maintaining the second optical link, by controlling the orientation direction in which the second optical communication terminal performs optical communication via the second optical link, further on a basis of the detected third error.

4. An optical communication terminal as the second optical communication terminal, comprising:
   the orientation direction control device according to claim 3,
   a second optical communication terminal transceiver to detect the receiving direction information of the second optical communication terminal by receiving light via the second optical link, and
   a second optical communication terminal capture and tracking mechanism to perform capture and tracking for maintaining the second optical link by changing an orientation direction of the second optical communication terminal transceiver on a basis of control by the processing circuitry.

5. An optical communication system comprising
   an optical communication terminal as the second optical communication terminal according to claim 4 and the first optical communication terminal, wherein
   the first optical communication terminal includes:
   a first optical communication terminal transceiver to detect receiving direction information regarding a direction in which light is received via the first optical link, by receiving the light via the first optical link;
   processing circuitry
   to acquire the receiving direction information detected by the first optical communication terminal transceiver,
   to detect the first error of the orientation angle at which the first optical communication terminal performs optical communication via the first optical link, by referring to the acquired receiving direction information, and
   to control capture and tracking for maintaining the first optical link, by controlling an orientation direction in which the first optical communication terminal performs optical communication via the first optical link, on a basis of the detected first error; and
   a first optical communication terminal capture and tracking mechanism to perform the capture and tracking for maintaining the first optical link, by changing an orientation direction of the first optical communication terminal transceiver, on a basis of control by the processing circuitry.

6. The optical communication system according to claim 5, wherein
   the processing circuitry
   acquires a third error,
   estimates a fourth error of an orientation angle at which the first optical communication terminal transceiver performs optical communication via the first optical link, on a basis of the acquired third error, and
   controls the capture and tracking for maintaining the first optical link, by controlling an orientation direction in which the first optical communication terminal transceiver performs optical communication via the first optical link, further on a basis of the fourth error estimated on the basis of the third error.

7. The orientation direction control device according to claim 1, wherein
   the acquired orientation direction control information further includes a first orientation angle for control used for controlling an orientation direction in which the first optical communication terminal performs optical communication via the first optical link, and
   the processing circuitry controls the capture and tracking for maintaining the second optical link, by controlling the orientation direction in which the second optical communication terminal performs optical communication via the second optical link, further on a basis of the acquired first orientation angle.

8. The orientation direction control device according to claim 7, wherein the processing circuitry
   converts the acquired first orientation angle to a second orientation angle for control used for controlling the orientation direction in which the second optical communication terminal performs optical communication via the second optical link, and
   controls the capture and tracking for maintaining the second optical link, by controlling the orientation direction in which the second optical communication terminal performs optical communication via the second optical link, further on a basis of the second orientation angle converted on a basis of the first orientation angle.

9. An orientation direction control device to control an orientation direction in which, in a satellite on which a first transmission/reception device to transmit and receive light and a second transmission/reception device to transmit and receive light or a radio wave are installed, the second transmission/reception device transmits and receives the light or the radio wave, the orientation direction control device comprising:
   processing circuitry
   to acquire orientation direction control information for controlling an orientation direction in which the first transmission/reception device transmits and receives the light, and
   to control the orientation direction in which the second transmission/reception device transmits and receives the light or the radio wave, on a basis of the acquired orientation direction control information, wherein
   the first transmission/reception device is an optical communication terminal to perform optical communication with an object via an optical link,
   the second transmission/reception device is an observation terminal to observe the Earth by transmitting and receiving light or a radio wave,
   the acquired orientation direction control information is an error defined as a difference between an orientation angle at which the optical communication terminal performs optical communication with the object via the optical link and a target orientation angle, and
   the processing circuitry calculates the error, and
   controls an orientation direction in which the observation terminal transmits and receives the light or the radio wave on a basis of the acquired error.

10. An orientation direction control method for controlling an orientation direction in which, in a satellite on which a first transmission/reception device to transmit and receive light and a second transmission/reception device to transmit and receive light or a radio wave are installed, the second transmission/reception device transmits and receives the light or the radio wave, the orientation direction control method comprising:

acquiring orientation direction control information for controlling an orientation direction in which the first transmission/reception device transmits and receives the light; and controlling the orientation direction in which the second transmission/reception device transmits and receives the light or the radio wave, on a basis of the acquired orientation direction control information, wherein the first transmission/reception device is a first optical communication terminal to perform optical communication with a first object via a first optical link, the second transmission/reception device is a second optical communication terminal to perform optical communication with a second object via a second optical link, the acquired orientation direction control information includes a first error defined as a difference between an orientation angle at which the first optical communication terminal performs optical communication with the first object via the first optical link and a target orientation angle, and the orientation direction control method further comprising:

calculating the first error, and controlling capture and tracking for maintaining the second optical link, by controlling an orientation direction in which the second optical communication terminal performs optical communication via the second optical link, on a basis of the acquired first error.

\* \* \* \* \*